(12) United States Patent
Ashton

(10) Patent No.: US 12,369,750 B2
(45) Date of Patent: Jul. 29, 2025

(54) HERB PROCESSOR

(71) Applicant: Jason Ashton, Aptos, CA (US)

(72) Inventor: Jason Ashton, Aptos, CA (US)

(*) Notice: Subject to any disclaimer, the term of this patent is extended or adjusted under 35 U.S.C. 154(b) by 189 days.

(21) Appl. No.: 17/960,038

(22) Filed: Oct. 4, 2022

(65) Prior Publication Data

US 2023/0027095 A1     Jan. 26, 2023

Related U.S. Application Data

(60) Continuation-in-part of application No. 16/915,633, filed on Jun. 29, 2020, now Pat. No. 11,497,351, which is a division of application No. 16/277,500, filed on Feb. 15, 2019, now Pat. No. 10,694,894.

(60) Provisional application No. 62/778,594, filed on Dec. 12, 2018.

(51) Int. Cl.
| | |
|---|---|
| *A47J 42/34* | (2006.01) |
| *A47J 42/14* | (2006.01) |
| *A47J 42/36* | (2006.01) |
| *A47J 42/40* | (2006.01) |

(52) U.S. Cl.
CPC ............... *A47J 42/34* (2013.01); *A47J 42/14* (2013.01); *A47J 42/36* (2013.01); *A47J 42/40* (2013.01)

(58) Field of Classification Search
CPC .. A47J 42/34; A47J 42/36; A47J 42/14; A47J 42/40
USPC ................................................ 241/168, 169.1
See application file for complete search history.

(56) References Cited

U.S. PATENT DOCUMENTS

| | | | | |
|---|---|---|---|---|
| 6,688,487 | B2 * | 2/2004 | Oakes ................ | B65D 43/0229 220/792 |
| 7,367,519 | B2 * | 5/2008 | de Groote ............... | A47J 19/04 241/168 |
| 7,886,999 | B2 * | 2/2011 | Ruzycky ................. | A47J 19/06 241/168 |
| 8,695,906 | B2 * | 4/2014 | Hainbach ................ | A47J 42/50 241/273.3 |
| 8,733,679 | B2 * | 5/2014 | Camitta .................. | B02C 18/24 241/89.4 |
| 9,681,777 | B1 * | 6/2017 | Dukat ..................... | B02C 18/18 |
| 9,730,554 | B2 * | 8/2017 | Chan ...................... | B65D 51/24 |
| 9,873,125 | B1 * | 1/2018 | LaGuardia, Jr. ........ | A24F 13/00 |
| 10,039,418 | B2 * | 8/2018 | Staiano ................... | A47J 42/00 |
| 10,349,780 | B2 * | 7/2019 | Dukat ..................... | B02C 23/10 |
| 10,492,524 | B2 * | 12/2019 | Ruzycky ................. | A47J 42/16 |
| 10,602,881 | B2 * | 3/2020 | Gumbel .................. | A47J 42/12 |
| 10,820,753 | B2 * | 11/2020 | Sanchez ................. | B02C 18/08 |
| D950,847 | S * | 5/2022 | Harthoorn .................... | D27/195 |
| 11,406,130 | B2 * | 8/2022 | Grant ..................... | B02C 23/10 |

(Continued)

*Primary Examiner* — Christopher L Templeton
*Assistant Examiner* — Teresa A Guthrie
(74) *Attorney, Agent, or Firm* — Donald R. Boys; Central Coast Patent Agengy LLC

(57) ABSTRACT

A herb grinder has a first cutting element having a first annular body projecting from a base disk having an annular rim, and cutting blades extending from a floor in a first areal region separate from a second areal region having no cutting blades, and a second cutting element having a second annular body with a planar top having a through opening and cutting blades extending from an inside surface of the top, the second cutting element engaging the first cutting element at a specific position wherein the opening through the top lies directly over the second areal region of the floor of the first cutting element having no cutting blades.

24 Claims, 34 Drawing Sheets

(56) References Cited

U.S. PATENT DOCUMENTS

| | | | | |
|---|---|---|---|---|
| D964,798 S | * | 9/2022 | Ding | D7/381 |
| 11,497,352 B1 | * | 11/2022 | Acar | A47J 42/30 |
| 11,730,184 B2 | * | 8/2023 | Hall | A47J 42/12 |
| | | | | 241/92 |
| 11,737,603 B1 | * | 8/2023 | Qutami | A47J 42/38 |
| | | | | 241/28 |
| 11,779,057 B2 | * | 10/2023 | Wozniak | A47J 42/34 |
| | | | | 241/88 |
| 2008/0191073 A1 | | 8/2008 | Bao | |
| 2009/0224088 A1 | | 9/2009 | Ruzycky | |
| 2013/0015278 A1 | * | 1/2013 | Edwards | A47J 42/40 |
| | | | | 241/69 |
| 2014/0217213 A1 | * | 8/2014 | Edwards | A47J 42/38 |
| | | | | 241/91 |
| 2016/0106262 A1 | * | 4/2016 | Mroue | B02C 23/10 |
| | | | | 241/79 |
| 2018/0338642 A1 | * | 11/2018 | Staiano | A47J 42/34 |
| 2019/0000140 A1 | * | 1/2019 | Manning | A24F 19/10 |
| 2019/0110644 A1 | * | 4/2019 | Sanchez | A47J 43/25 |
| 2019/0150666 A1 | * | 5/2019 | Wozniak | A47J 42/34 |
| 2019/0269277 A1 | | 9/2019 | Larose | |
| 2019/0269278 A1 | * | 9/2019 | Neury | A47J 42/34 |
| 2020/0061629 A1 | * | 2/2020 | Breneman | A47J 42/34 |
| 2020/0187716 A1 | | 6/2020 | Ashton | |
| 2020/0187717 A1 | * | 6/2020 | Pagan | A47J 42/34 |
| 2020/0268207 A1 | | 8/2020 | Abehasera | |
| 2020/0367695 A1 | | 11/2020 | Staiano et al. | |
| 2020/0390285 A1 | * | 12/2020 | Galaviz | A47J 42/24 |
| 2022/0218152 A1 | * | 7/2022 | Joel | A47J 42/12 |
| 2022/0234795 A1 | | 7/2022 | Auerbach | |
| 2023/0027095 A1 | | 1/2023 | Ashton | |
| 2023/0363587 A1 | * | 11/2023 | Husted | A47J 42/14 |

\* cited by examiner

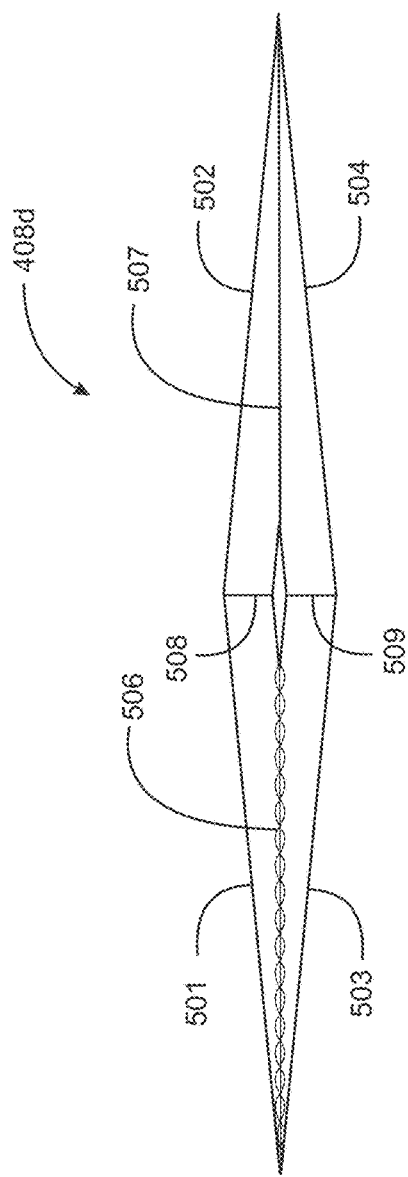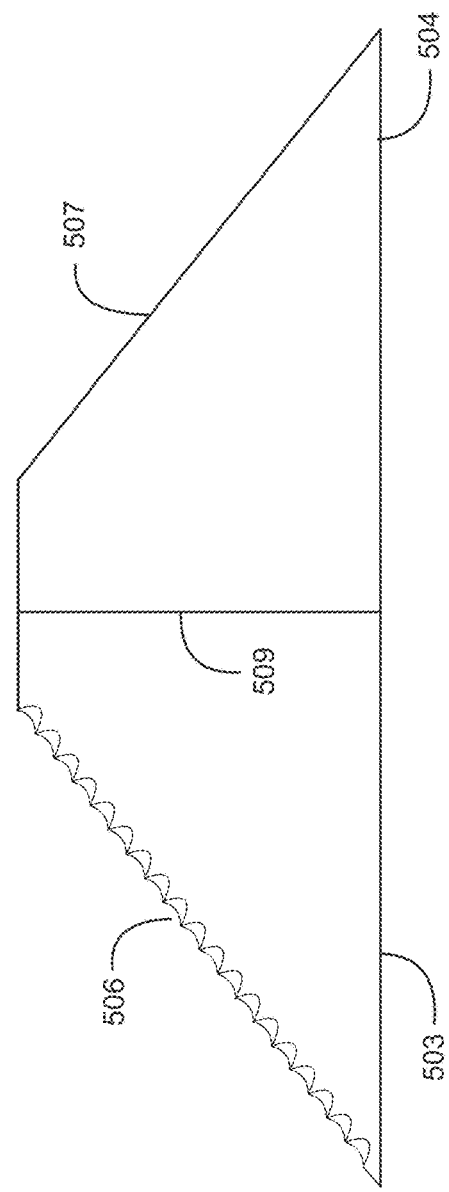
Fig. 5B
Fig. 5C

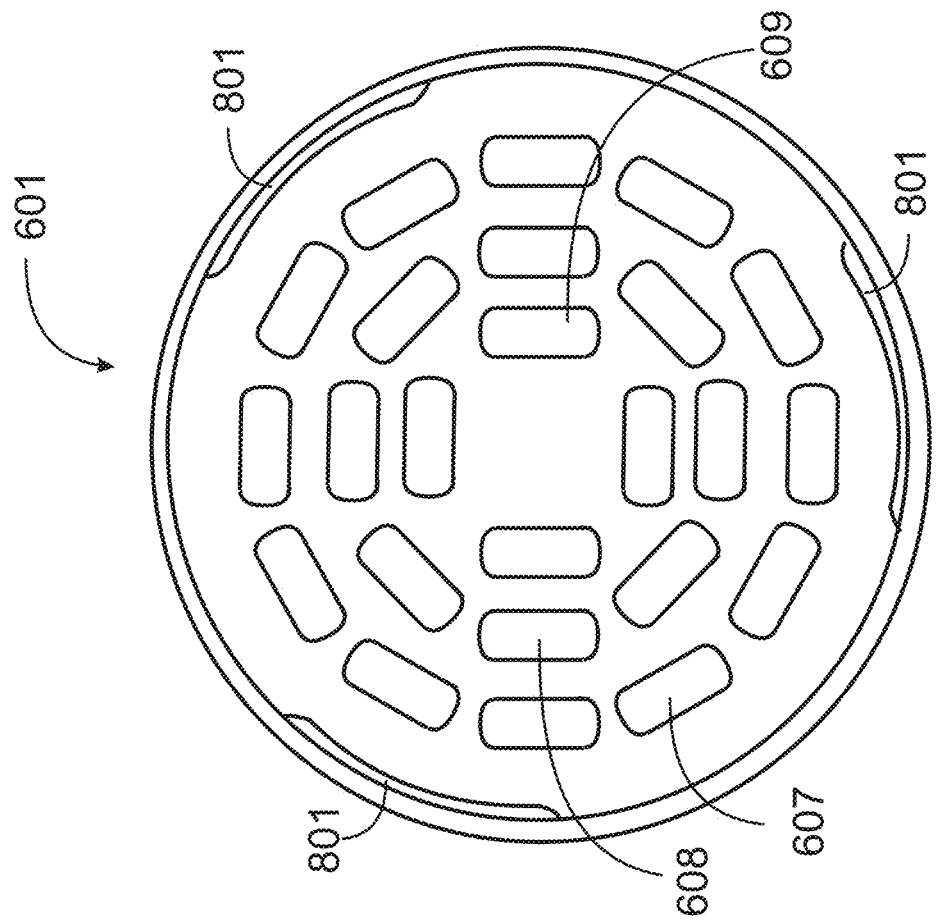
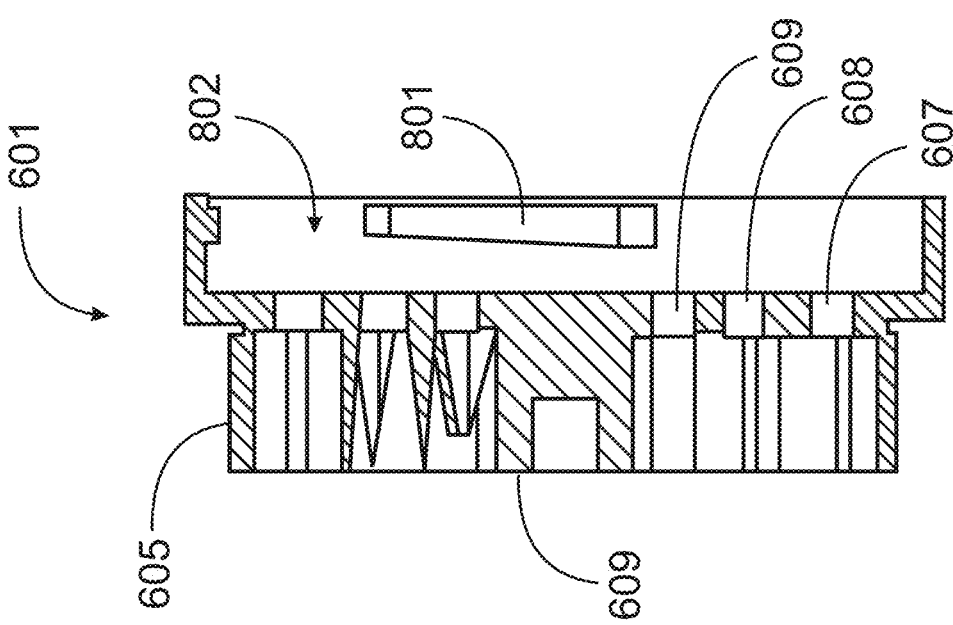
Fig. 8B
Fig. 8A

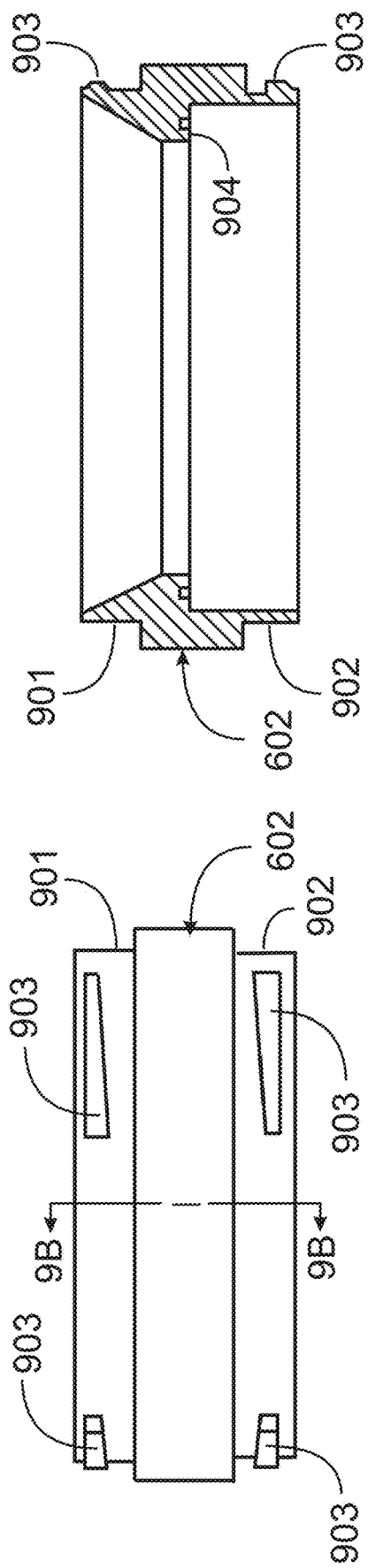

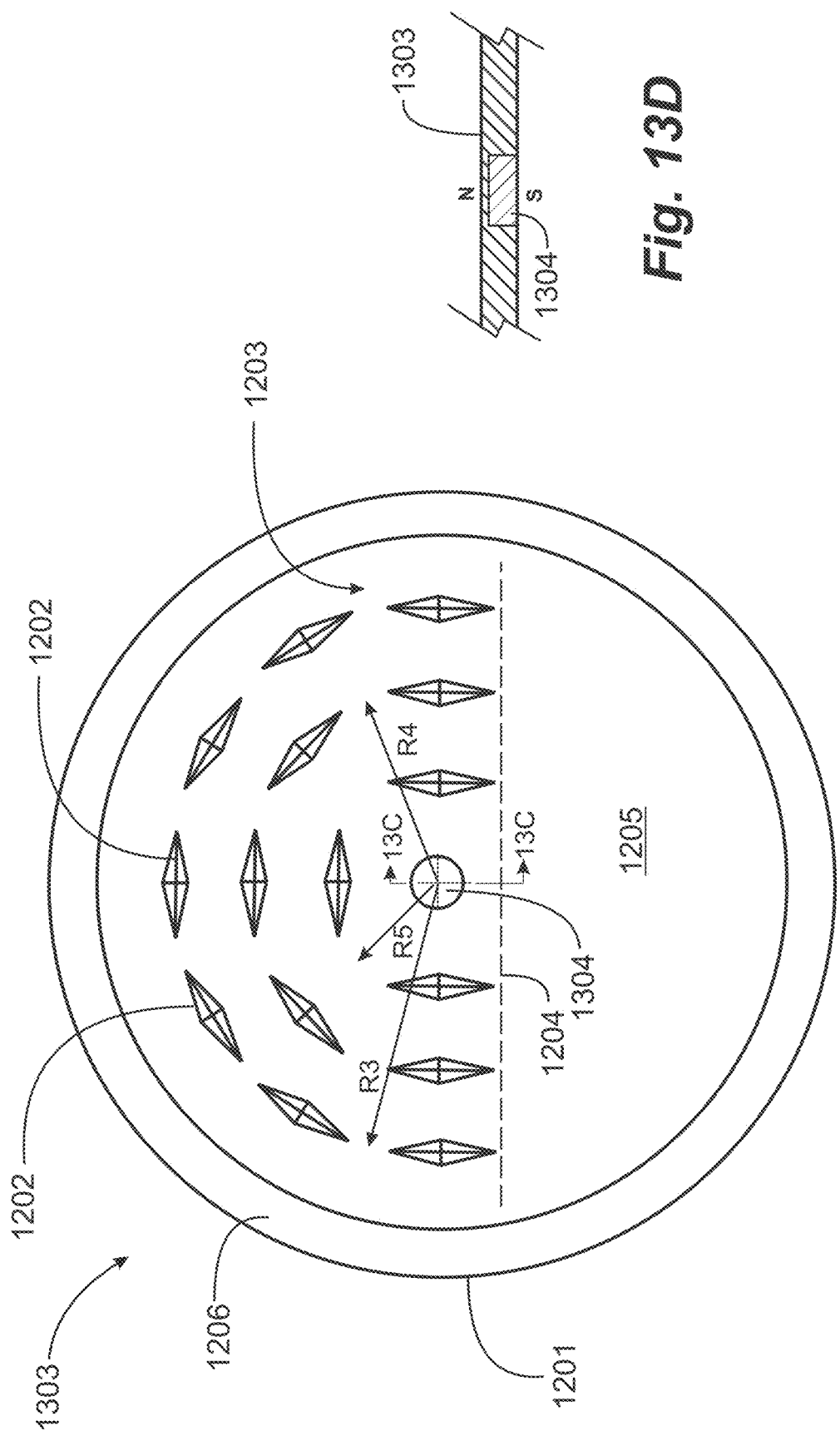

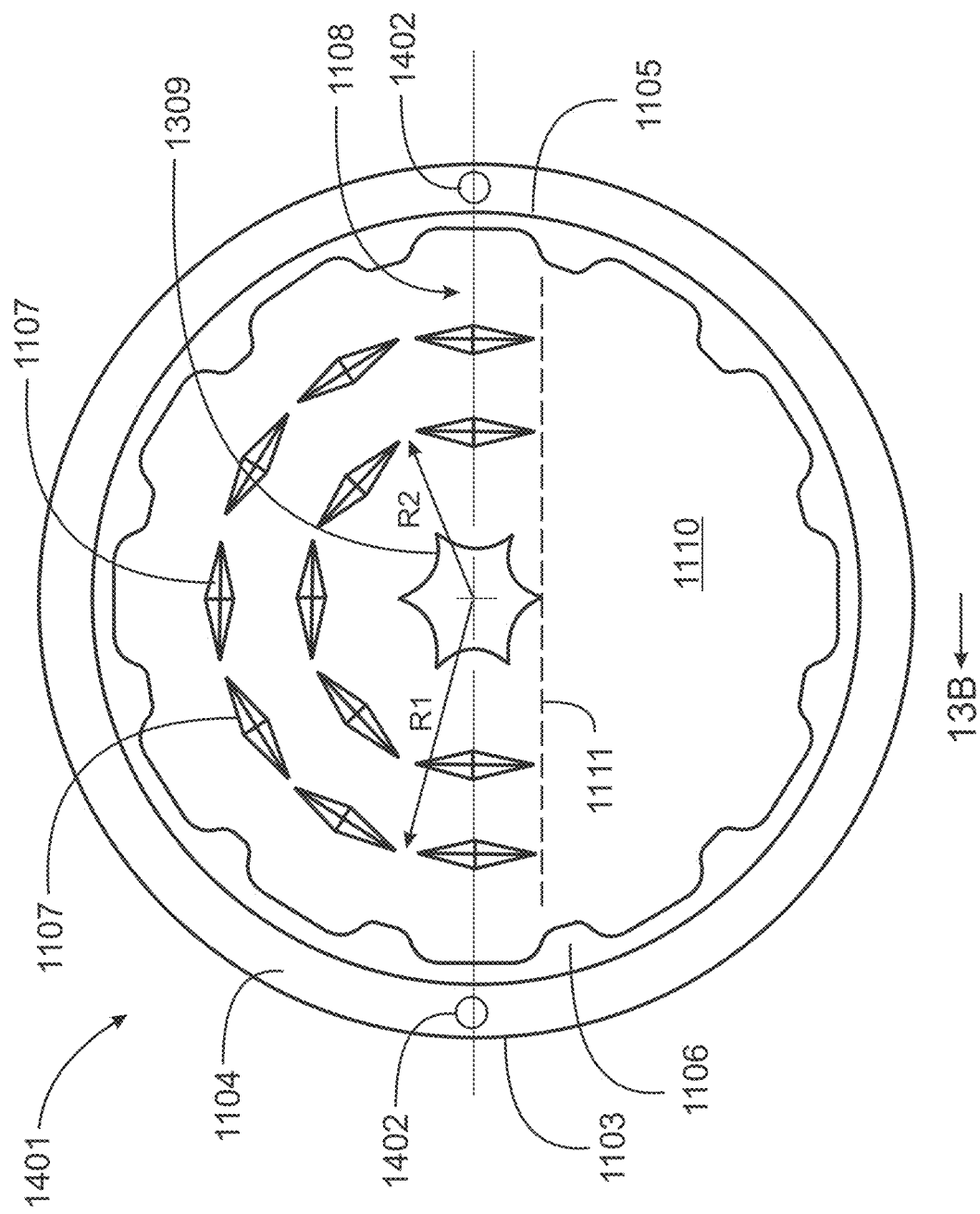

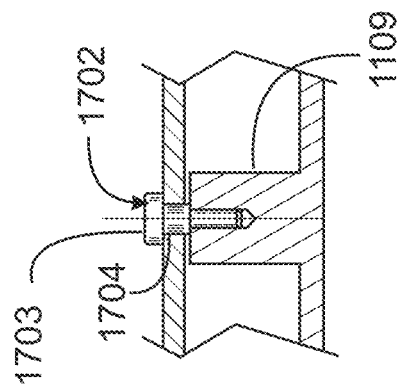
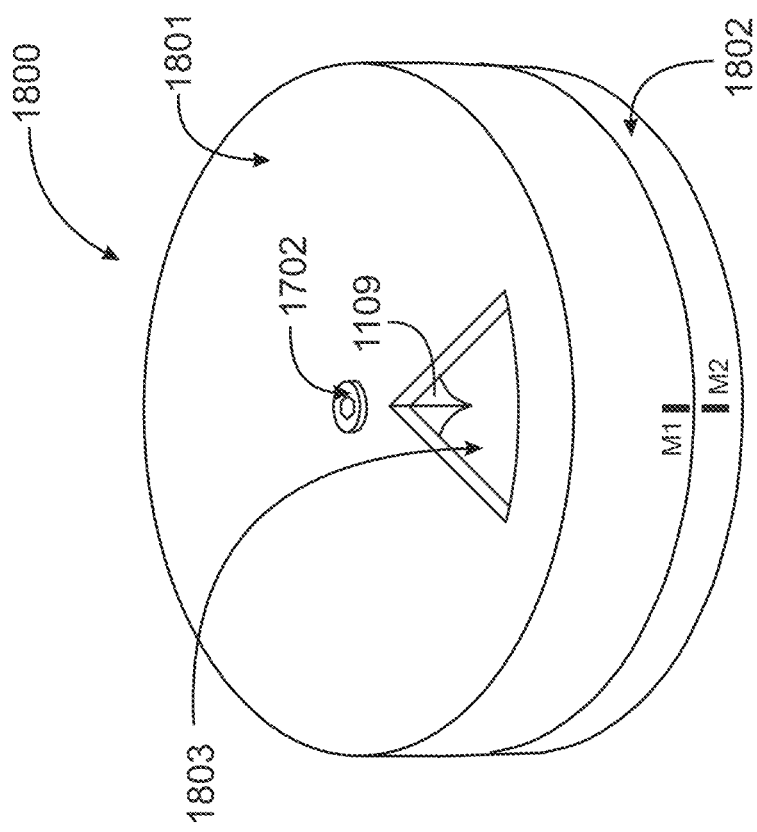
Fig. 18B
Fig. 18A

HERB PROCESSOR

CROSS-REFERENCE TO RELATED DOCUMENTS

The present invention is a Continuation-in-Part of and claims priority to case application Ser. No. 16/915,633 filed 29 Jun. 2020, now issued as U.S. Pat. No. 11,497,351 on Nov. 15, 2022, which is a divisional case claiming priority to Ser. No. 16/277,500 filed 15 Feb. 2019 now issued as U.S. Pat. No. 10,694,894 on 30 Jun. 2020, which claimed priority to provisional patent application 62/778,594 filed 12 Dec. 2018, and all disclosure of the parent cases is incorporated at least by reference.

BACKGROUND OF THE INVENTION

1. Field of the Invention

The present invention is in the technical area of grinding apparatus and methods for grinding aromatic herbs and pertains more particularly to hand-held and manually operated apparatus.

2. Description of Related Art

There exists a relatively rich body of issued United States patents and published patent applications in the technical area of grinding such as tobacco and other aromatic herbs. The present applicant has provided with this patent application an Information Disclosure Statement (IDS) listing a number of US patents and published patent applications that teach apparatus and methods in the area of the technology of the present application. This list may not be all such applications and patents but may list most such applications and patents. This specification refers to figures and description of individual ones of these published documents, all of which may be considered to predate the filing of the instant application.

Most grinders of the hand-held and manually operated sort have many features in common, such as opposing rotating elements with teeth or blades that fit together in a way to provide a shredding process, a catching basin, and in many such devices a screen separating finely ground product from more coarsely ground material. The known prior art provides a variety of differences means to provide specific functionality, but the present inventor is of the opinion that much improvement may be made, which is a purpose of the present patent application.

BRIEF SUMMARY OF THE INVENTION

Brief Description of the Several Views of the Drawings

FIG. 5B is a top plan view of an exemplary blade in an embodiment of the invention with a serrated cutting edge.

FIG. 5C is a side elevation view of the exemplary blade of FIG. 5B.

FIG. 8A is a section view of the lower cutting element of FIG. 7A taken along section line 8A-8A in an embodiment of the invention.

FIG. 8B is a plan view of the lower cutting element of FIG. 7 in a direction opposite to the view of FIG. 7.

FIG. 9A is an elevation view of a catching chamber disengaged from other elements in an embodiment of the invention.

FIG. 9B is a section view of the catching chamber of FIG. 9A taken along section line 9B-9B.

FIG. 13C is a plan view of an upper cutting element in another embodiment of the invention.

FIG. 13D is a partial section through a floor of upper cutting element 1301 of FIG. 13C.

FIG. 14A is a plan view of a lower cutting element in another embodiment of the invention.

FIG. 18A illustrates a grinder with an upper cutting element with an opening and a lower cutting element engaged and constrained in engagement by a fastener.

FIG. 18B shows the engagement by the fastener in an embodiment of the invention.

DETAILED DESCRIPTION OF THE INVENTION

Figure 1:
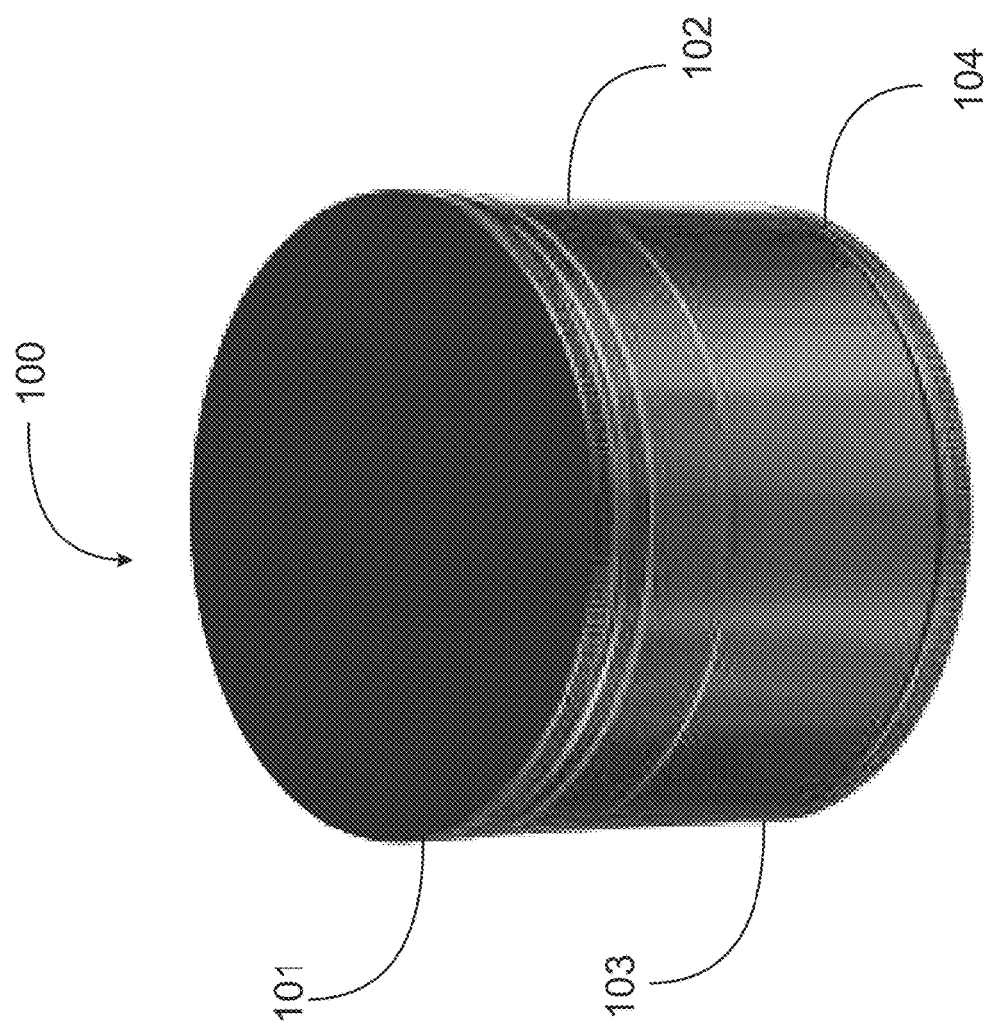
FIG. 1 is a perspective view of a herb grinder in the prior art.

FIG. 1 is a perspective view of a herb grinder 100 in the prior art, manufactured and marketed by an enterprise on the West Coast. Grinder 100 has 4 main parts. An upper grinder element 101 having downward-facing teeth (not shown in FIG. 1) engages a lower grinder element 102 having upward-facing teeth (also not shown in FIG. 1). Lower grinder element 102 engages a catching chamber 103 with a purpose of catching and holding ground or shredded material. In some embodiments catcher chamber 103 has an internal fine screen (not shown) that allows very fine material to pass through into a lower catcher chamber 104, while holding less finely shredded material on the screen.

Figure 2:
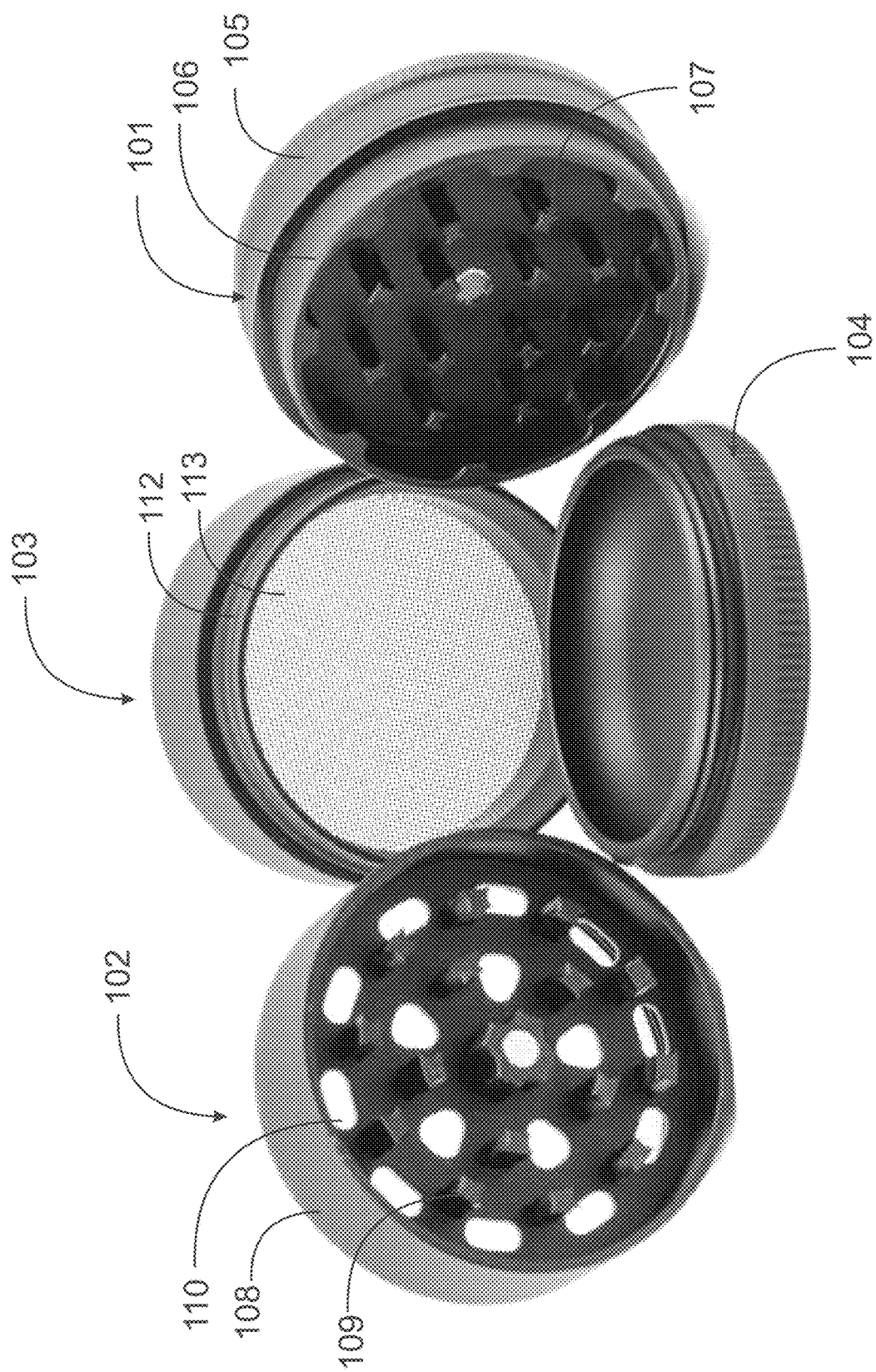
FIG. 2 is a perspective exploded view of the herb grinder of FIG. 1.

FIG. 2 is an exploded view of herb grinder 100 showing elements not seen in FIG. 1. Upper grinder element 101 has a body 105 at a larger diameter than a descending cylindrical ring 106. Teeth 107 extend downward in a specific pattern from a horizontal top disk. Lower grinder element 102 has a body 108 and upwardly-extending teeth 109 from a bottom disk which has through-openings 110.

In assembly as seen in FIG. 1, descending cylindrical ring 106, which has an outer diameter just slightly less than an inner diameter of upwardly-extending cylindrical body 108, fits into the inner diameter of body 108 up to a lip formed between body 105 and descending cylindrical ring 106. When engaged the teeth of upper grinder element 101 fit between the teeth of lower grinder element 102, as the teeth are positioned and spaced in the two elements to accomplish this purpose. Relative rotation between elements 101 and 102 cause relative rotation between the sets of teeth to accomplish a grinding effect on material smashed between tightly-grouped elements 101 and 102. In some apparatus magnets may be used to keep the elements in contact and engagement, without preventing the relative rotation necessary to grind material placed in the apparatus.

Catcher element 103 has a cylindrical body and is occluded by a fine-meshed screen 113 in horizontal aspect, such that material passing through openings 110 in the lower disk of lower grinder element 102, having been shredded, will collect in catcher element 103 on the screen, which will allow very fine material to pass through to be caught in lower catcher chamber 104.

Referring again to FIG. 2, lower grinder element 102 has female threads on a lowermost extension, not seen in FIG. 2, which in assembly engage male threads 112 at an uppermost extension of catcher element 103, such that the two may be joined, such that ground material from the volume between upper grinder element 101 and lower grinder element 102 may pass through openings 110 and fall into catcher chamber 103. Lower catcher chamber 104 and catcher chamber 103 join by threads formed on an upper region of the lower catcher chamber and a lower region of the catcher chamber.

Upper grinder elements constrained to rotate relative to lower grinder elements joined to a catcher container are common to most herb grinder apparatus known in the prior art.

Figure 3:
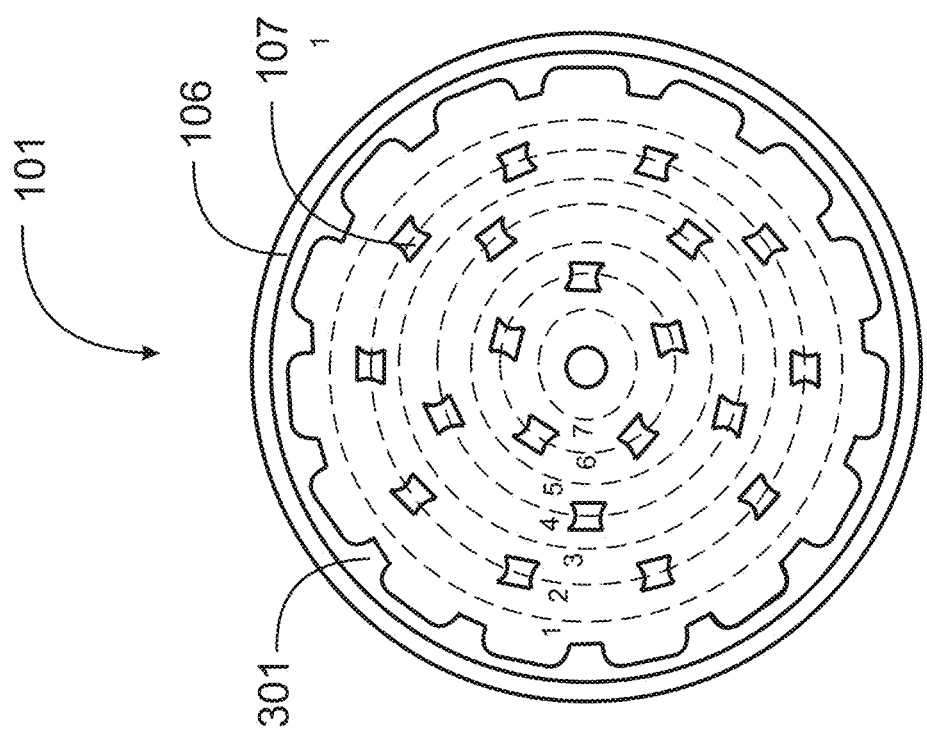
FIG. 3 is a plan view of an upper grinder element in the prior art.

FIG. 3 is a plan view of upper grinder element 101 in an example of the prior art, looking into the open end. Teeth 107 are seen in the direction of the vertical axis of the teeth. The inside diameter of descending cylindrical ring 106 is made with a series of extensions 301 spaced evenly around the circumference, which provide a mixing action to shredded material in operation in an assembled grinder. Teeth 107 in this example are evenly spaced along a circumference at three different radii with ten teeth at an outer radius marked "2". There are five teeth at a smaller radius marked "4", and five more at a yet smaller radius marked "6". There are twenty teeth in all in this example.

Three additional radii labeled "1", "3" and "5" are spaced between the radii of the radii "2", "4" and "6". The spacing is such that teeth extending from a base disk in lower grinder element 102, when the grinder elements are engaged, may occupy space along the even-numbered radii, such that relative rotation between the grinder elements will cause teeth in one element to pass close to, and in some cases between, the teeth of the other element. This passage of teeth provides the grinding or grinder action desired. It may be noted that the shapes of the teeth in these examples of the prior art contribute to crushing of material in loading the material prior to grinding, and further crushing of material is grinding is implemented.

Figure 4:
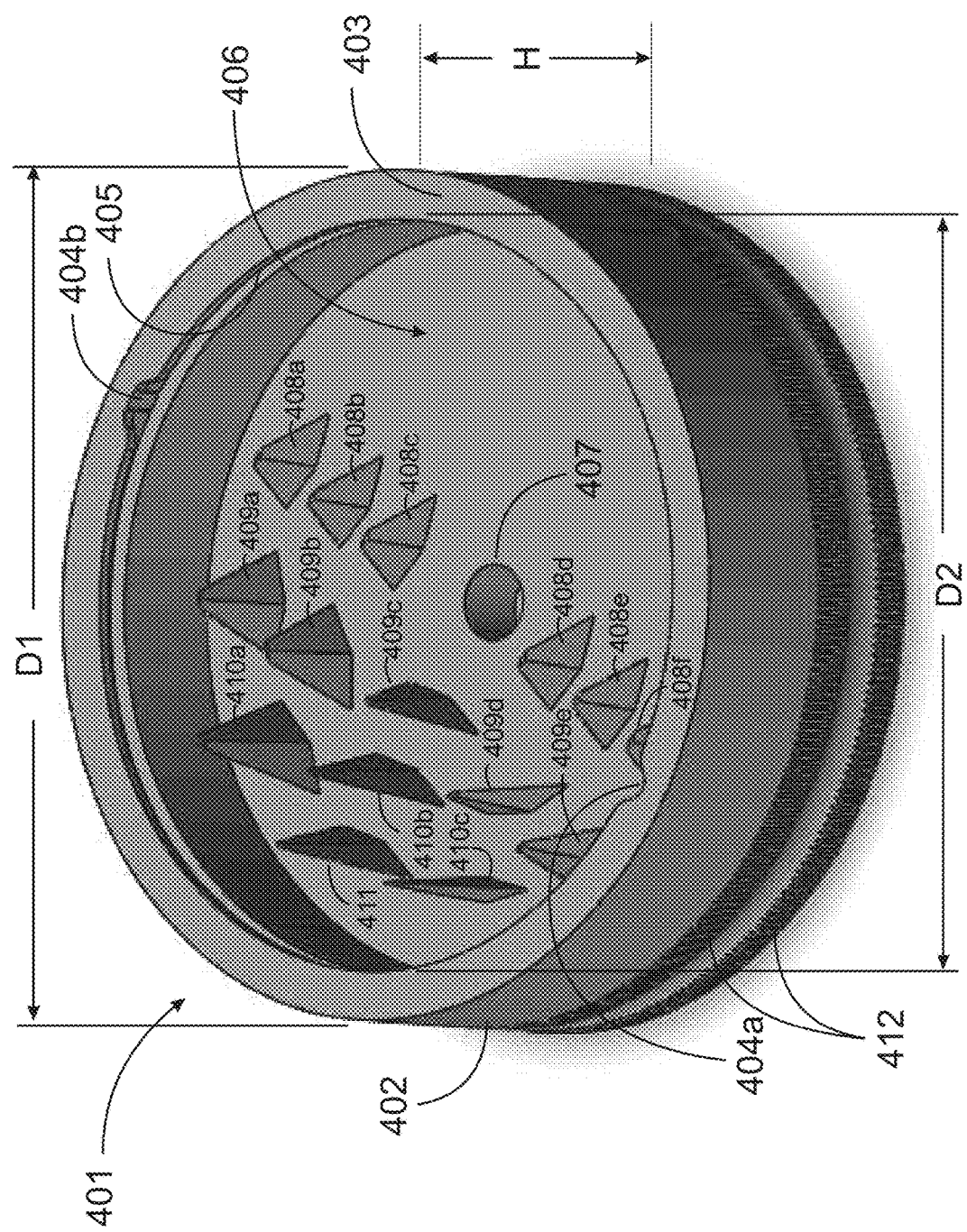
FIG. 4 is a perspective view of an upper cutting element in an embodiment of the present invention.

FIG. 4 is a perspective view of an upper cutting element 401 in an embodiment of the present invention. This cutting element is analogous to grinder element 101 of FIGS. 1 and 2 in the prior art but differs in several unique aspects.

Upper cutting element 401 of FIG. 4 has a body 402 in this embodiment in a cylindrical aspect having an outside diameter D and a height H, with a planar floor 406 having a central small hole 407. The open end of cylindrical body 402 has a flat, horizontal surface 403. A circumferential groove 405 near the open end of the cylinder has two opposite cut-out regions 404a and 404b into the groove. Cut-out 404a is smaller in area than cut-out 404b. Circumferential groove 405 engages projection keys from the outside diameter of a portion of a lower cutting element, as is described in further detail below, enabling the upper and lower cutting elements to be engaged only in a specific rotational aspect before shredding motion begins. A straight knurl pattern is imposed in two places 412 as an aid for a user to grip the cutting elements in a shredding operation.

In this embodiment there are fifteen blades extending from floor 406 into a cavity bounded by the inner wall of the cylinder and the floor. The blades are labeled in FIG. 4 as 408a through 408f, 409a through 409e, and 410a through 410c. Individual ones of the blades are shaped as a flattened, truncated pyramids, as may be seen in FIG. 4, but the blades occupy very specific positions, are oriented differently in specific cases, and vary in height in a specific way, as described more fully below.

Figure 5A:
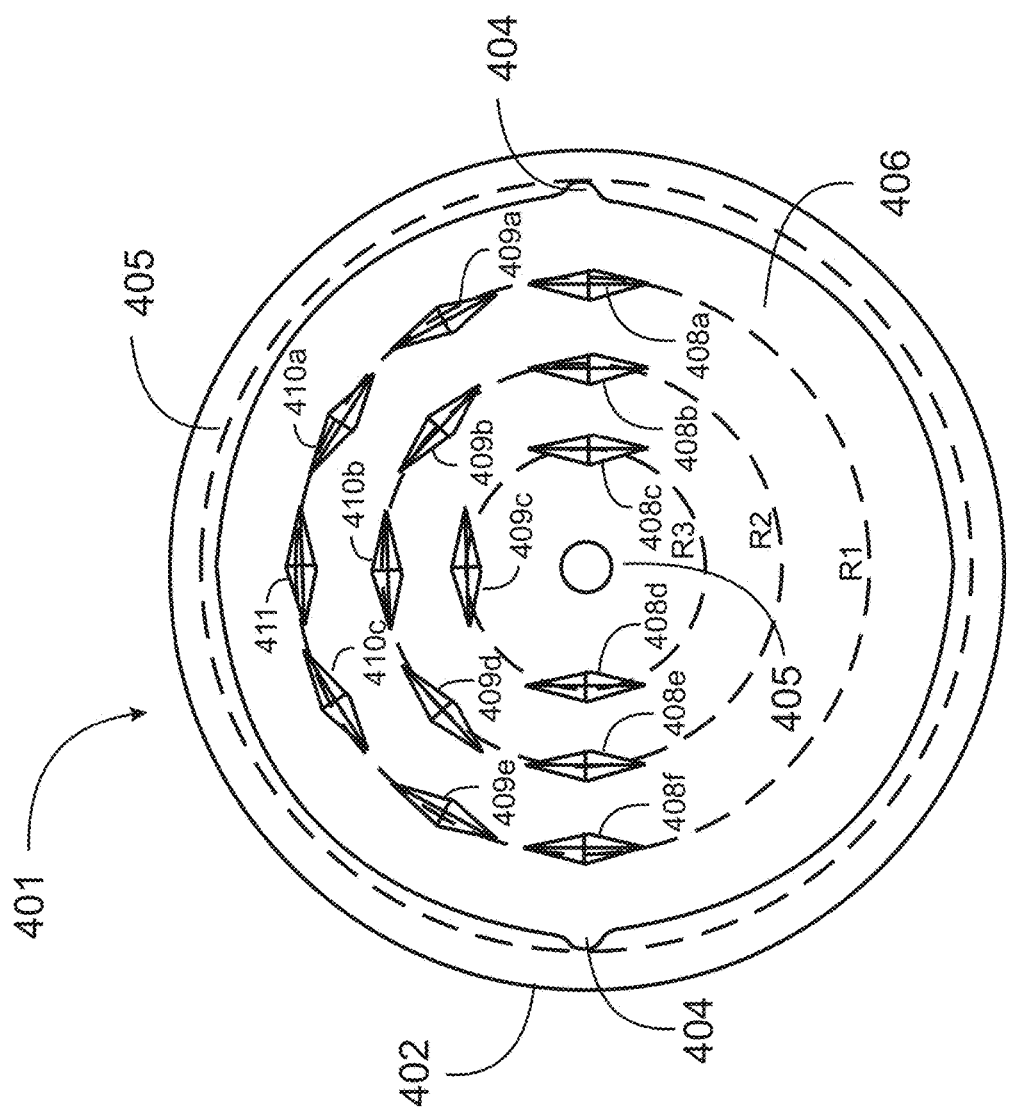
FIG. 5A is a plan view of upper cutting element of FIG. 4.

FIG. 5A is a plan view of upper cutting element 401 of FIG. 4, looking into the open end of the element. The outside and inside concentric diameters of cylindrical body 402 result in a wall thickness, and concentric groove 405 is shown as a hidden line. All fifteen blades are illustrated extending upward from floor 406, labeled with the same element numbers used in FIG. 4.

Blades 408a through 408f, arranged in this example in a row across a diameter of the cutting element, are of a common height. Blades 409a through 409e have a common height greater than the common height of blades 408a through 408f. Blades 410a through 410c have a common height greater than the common height of blades 409a through 409e. The single remaining blade 411 is greater in height than any of the other blades and is therefore the tallest of the fifteen blades in this example.

It may be seen in FIG. 5A that blades 408a, 409a, 410a, 411, 410c, 409e and 408f are arranged sequentially counterclockwise on an outermost radius labeled R1. Blades 409b, 410b, 409d and 408e are arranged sequentially counterclockwise along a smaller radius labeled R2. Finally, blades 408c, 409c and 408d are arranged sequentially counterclockwise along a smallest radius labeled R3.

The height dimensions for the blades and the radial placement, taken together, are seen to provide, along any one of the three radii, that the blades followed either clockwise or counterclockwise, from the first in the sequence in either direction, start with a shortest blade, ascending to a tallest blade, and descending again to a shortest blade.

Further to the above, some of the blades have leading and trailing edges, depending on which way the cutting element may be turned, that are straight cutting edges. Some of the blades, however, have leading and trailing edges that are serrated, as a steak knife, for example, may be serrated. FIG. 5B presents a top view of an example blade 500 with a serrated cutting edge 506. FIG. 5C is a side elevation view of the serrated blade of FIG. 5B. Blade 500 has edges 501, 502, 503 and 504 that intersect with the base plane of the lower cutting element in this case. Edges 508 and 509 are side vertical edges, and edges 506 and 507 are leading or trailing cutting edges, dependent on which way the opposing cutting elements may be turned relative to one another while engaged.

In FIGS. 5B and 5C only one cutting edge, 506, is shown to be serrated, but the skilled person will understand that in alternative embodiments both of the leading/trailing edges may be serrated, and indeed, serration may be only along specific portions of edges.

Referring again to FIG. 5A, the six blades that have serrated leading and/or trailing edges in this particular example are blades 409a, 411 and 409e at radius R1, 408b and 408e at radius R2, and single blade 409c at radius R3. In alternative embodiments of the invention the serration might be on any grouping of blades, and on either or both of the leading or trailing edges. Further, the apparent dimensions of serrations along edge 5606 in FIG. 5C is exemplary only. The serration may have any dimensional parameters that are possible.

Figure 5D:
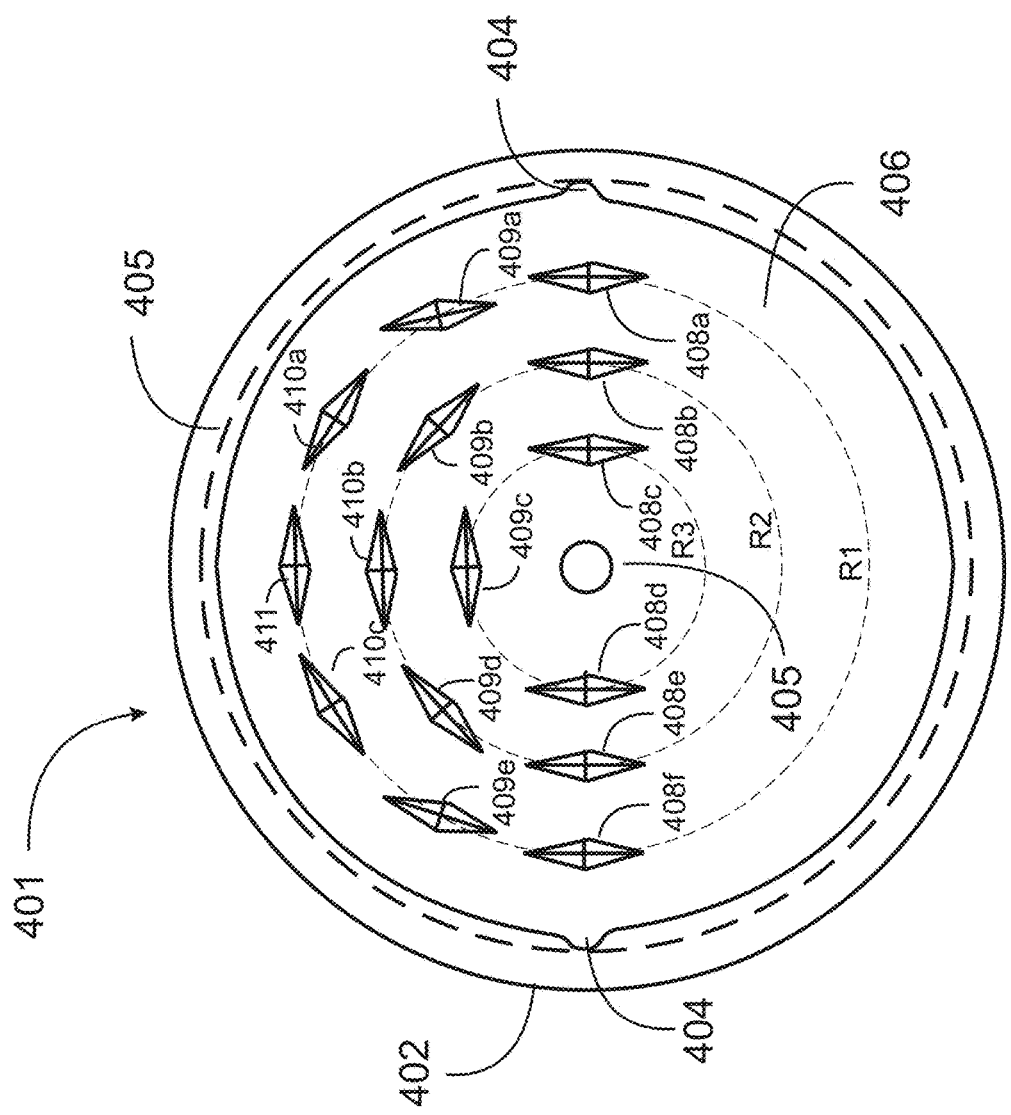
FIG. 5D is a plan view of an upper cutting element illustrating a different blade orientation in an embodiment of the invention.

FIG. 5D is a plan view of a lower cutting element 401 very similar to that of FIG. 5A, illustrating some further detail that may be used in some embodiments. In FIG. 5D the dotted circles at the three radii that define blade locations are shown in a lighter line width, so positions and orientation may be better seen. The blades, such as blades 408a through 408f, for example, are generally seen to be oriented with respect to the radii, such that a line from tip-to-tip for a blade will be tangential to the radius of its location. This orientation effects the direction of the leading cutting edge of a blade when the lower and upper cutting elements are engaged and rotated together. This is not the case in every embodiment, however.

Notice is drawn in FIG. 5D to blades 409a and 409e. These two blades are shown to be centered on radius R1, as are the other blades, but blades 409a and 409e are rotated about their vertical centers such that the leading and trailing edges face in a somewhat different direction than for the other blades. Both may be said to be turned "inward" by perhaps ten degrees each. This change causes the cutting edge in operation to follow a different path than directly behind the blade "in front", depending upon the relative motion between the two engaged cutting elements. In other embodiments other treatments may be employed.

This change is shown in FIG. 5D for just two blades, but in alternative embodiments every blade, or any number of blades, may be rotated thusly, and in different directions and by different angles, depending upon plans and expectations of a designer of different embodiments of the invention.

Figure 6:
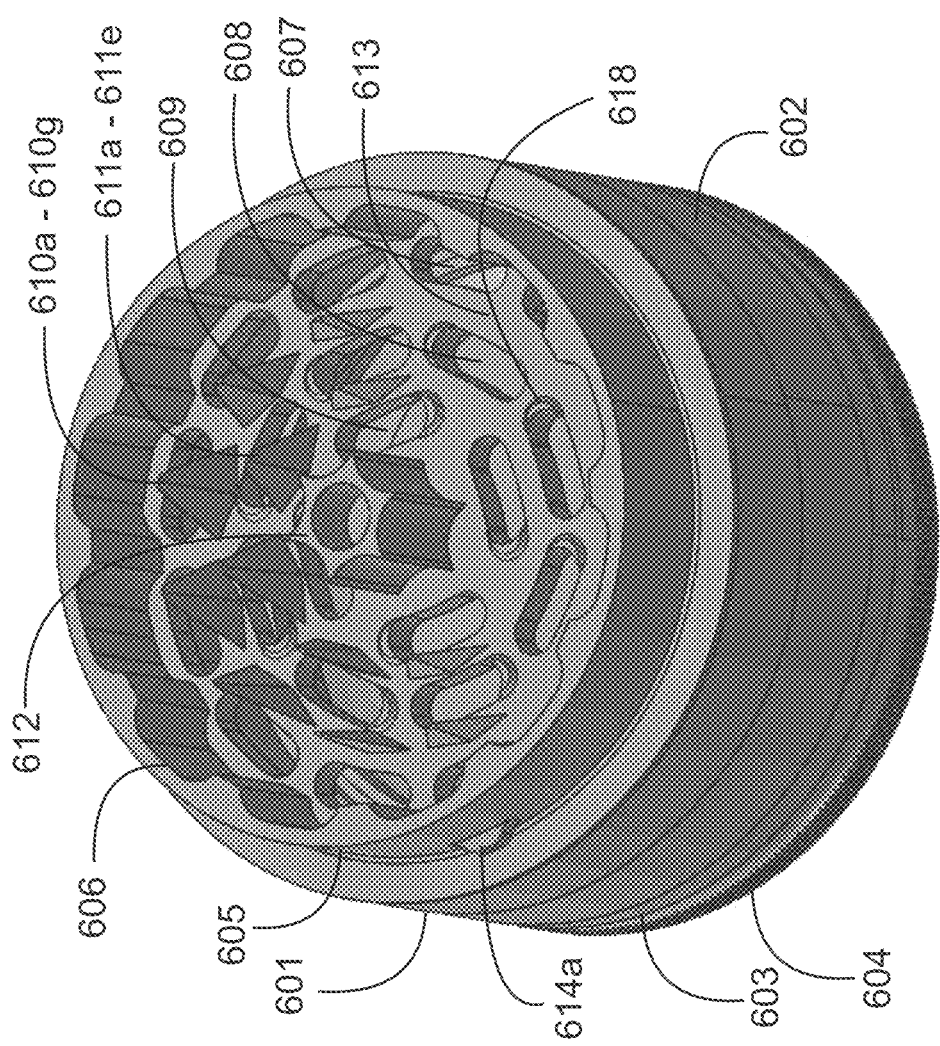
FIG. 6 is a perspective view of a lower cutting element in an embodiment of the invention.

FIG. 6 is a perspective view of a lower cutting element 601 assembled to a catching chamber 602, which is in turn assembled to a lower catching chamber 603 in an embodiment of the present invention. These elements are generally, but not specifically, analogous to the lower cutting element 102, catching chamber 103 and lower catching chamber 104 of FIG. 3, but have many unique features distinguishing patentably over the conventional art.

In FIG. 6 lower cutting element 601 has an upwardly-extending cylindrical portion 605 forming an inner volume having a floor 613. A series of indentions 606 are formed into the wall of cylindrical portion 605 on the inside vertical surface and serve in operation to help stir and blend materials introduced to be shredded, cut with either straight, differing types, or serrated edges of blades.

The outside diameter of cylindrical portion 605 is just slightly less than the inside diameter of the upper cutting element 401 of FIG. 4 and FIG. 5, so the upper cutting element may engage the lower by fitting over the outer diameter of cylindrical portion 605 of the lower cutting element.

An extending key element 614a from the outer diameter of cylindrical portion 605 has a counterpart 614b on the opposite side, not seen in FIG. 6, and these keys serve to limit the rotational orientation of the upper and lower cutting elements in engagement by entering openings 404 that show in FIGS. 4 and 5, to engage inner groove 405. In the act of engaging the upper cutting element to the lower, these keys provide that the engagement may only be accomplished at one specific rotational relationship, about which more is described below.

Floor 613 of the lower cutting element has a plurality of openings 607, 608 and 609, arranged in a specific pattern, described in detail further below. These openings enable cut and shredded material to pass through to catching chamber 602. A plurality of blades 610a through 610g, and 611a through 611e in this example extend upward from floor 613, in a specific pattern described in more detail below. These blades offset radially from the blades of the upper cutting element, so there is no interference in operation, and the passing of blades in each cutting element serves to cut the material introduced. A star-shaped extension 612 projects upwardly from the floor at the center of the lower cutting element. The lower catching chamber 603 at the bottom of the assembly has a knurl pattern 604 enabling a sure grip by a user.

Openings 607, 608 and 609 in this example are curvilinear, having a constant width in the curved direction of a radius and a specific length along the radius, and have half-round ends, as shown. This is exemplary, and not limiting in the scope of embodiments of the invention. Opening of many other shapes might be used.

In one embodiment individual ones of openings 607, 608 and 609 may have an additional detail 618 termed a grating element. These are areas at one, or even both ends of an opening. These grater elements are described and defined more fully below.

Figure 7A:
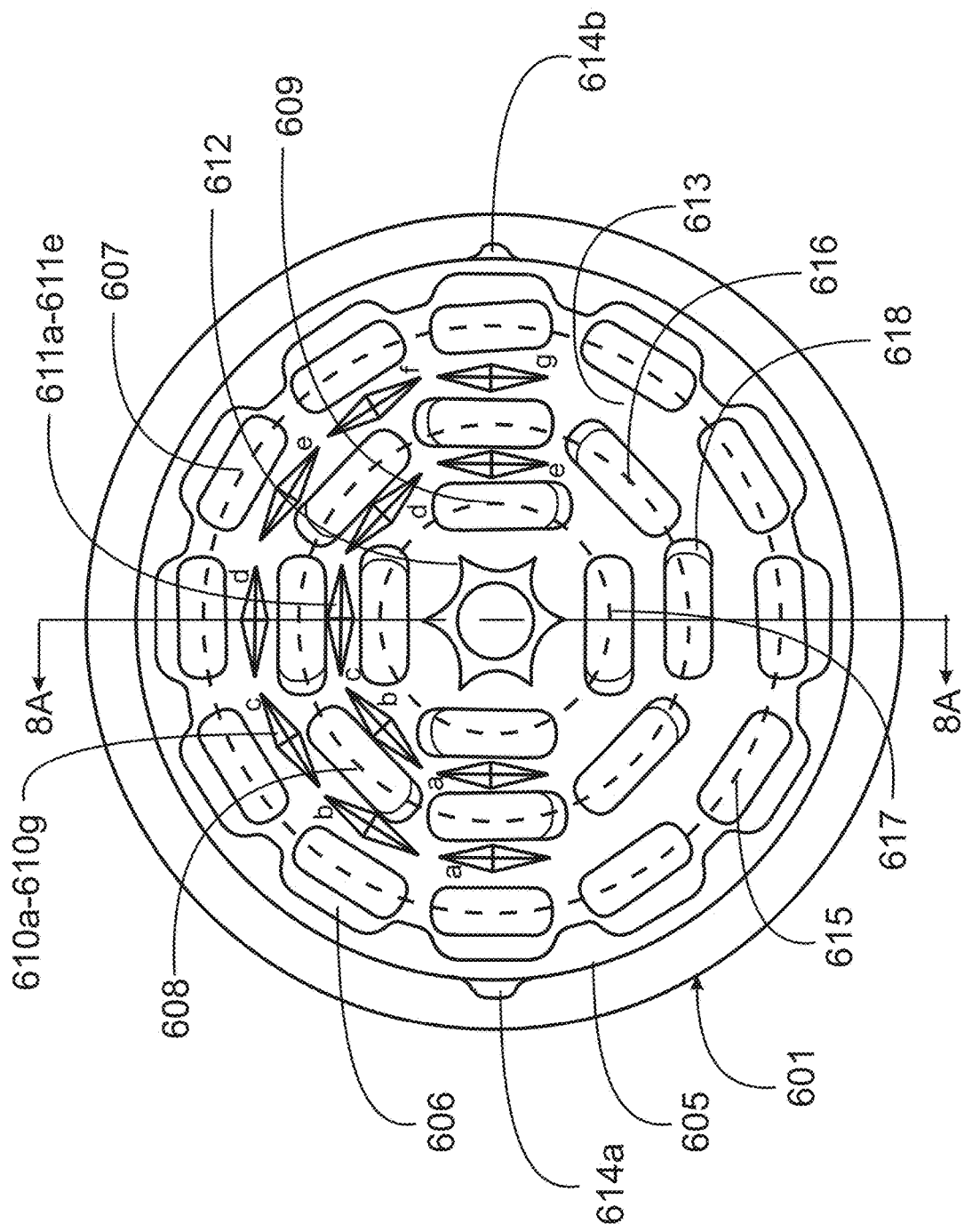
FIG. 7A is a plan view of the lower cutting element of FIG. 7 in an embodiment of the invention.

FIG. 7A is a plan view of lower cutting element 601 enabling clearer detailed description. In this plan view both keys 614a and 614b may be seen on diametrically opposite sides of the outside of cylindrical body 605. Key 614a is longer in arc length than is key 614b. The keys are sized to fit into the cut-outs 404a and 404b of the upper cutting element to engage the keys with circumferential groove 405 of upper cutting element 401. Larger key 614a fits into larger cut-out 404b, and smaller key 614b fits into smaller cut-out 404a. Thusly the upper and lower cutting elements may be initially engaged in one and only one rotational relationship.

Within the internal cavity of lower cutting element 601, bounded by the inner surface of cylinder 605 and floor 613, which has twelve indentions 606 equally spaced around the periphery at thirty-degree intervals, as described above with reference to FIG. 6, there are twelve openings 607 through floor 613 arranged also at thirty-degree intervals in a ring indicated by a dotted circle labeled 615 that places one each of the openings just inside each of indentions 606.

At a smaller radius indicated by dotted circle labeled 616 there are eight openings 608 equally spaced at forty-five degrees. At a yet smaller radius indicated by dotted circle 617 there are four more openings 609 spaced at ninety degrees. All of these openings are sized to enable shredded and cut material to pass through floor 613 into catching chamber 602. Star-shaped element 612 is seen also in the center as shown in FIG. 6.

In this example there are seven blades, individual ones in shape of a flattened, truncated pyramid, as described above, extending upward from floor 613 and spaced at thirty-degree intervals on a radius between the radii of circle 615 and circle 616. There are further five blades of similar shape and size on a radius between circles 616 and 617, at forty-five-degree intervals. The blades 610 are labeled a through g, and the blades 611 are labeled a through e. Blades 610b, d and f have serrated leading and trailing cutting edges in this example, as was described above for certain blades in the upper shredding element. Blades 611a, c and e also have serrated leading and trailing cutting edges in this example.

Further to the above, as was described with reference to FIGS. 4 and 5 for upper cutting element 401, not all of the blades of the lower cutting element may be of the same height. Referring again to FIG. 7, blades 610a and g, and blades 611a and e, are, in this embodiment, of the same size and height, and are the blades of least height in the lower cutting element. Blades 610b and f, and blades 611b and d, are of incrementally greater height than blades 610a and g, and blades 611a and e. Blades 610c and e, and blade 611c, are of a height incrementally greater than that of blades 610b and f, and blades 611b and d. Blade 610d is incrementally greater in height than blades 610c and e, and blade 611c.

Figure 7B:
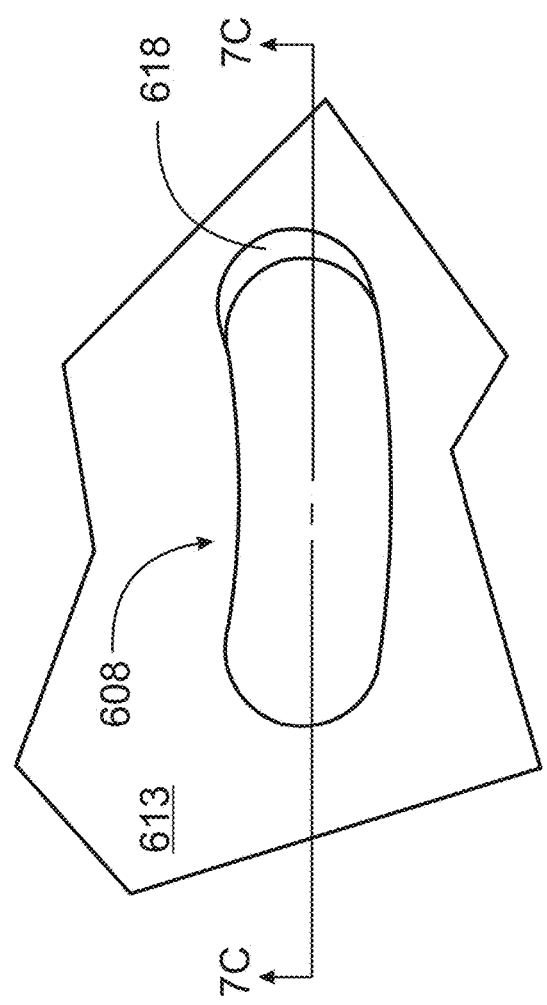
FIG. 7B is a plan view of an opening illustrating a grater element in an embodiment of the invention.
Figure 7C:
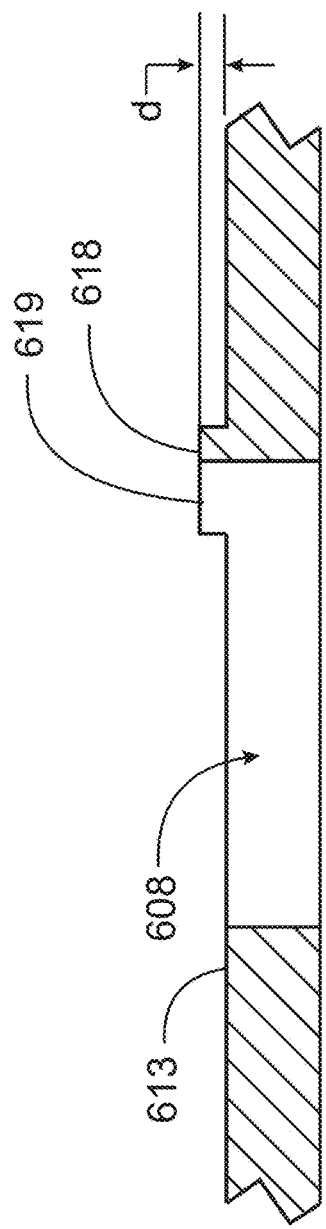
FIG. 7C is a side-elevation section view of the opening of FIG. 7B taken along section line 7C-7C of FIG. 7B.

Referring again to FIG. 7A, a greater element 618 is indicated at one end of each opening 608 through floor 613 arranged along dotted circle 616. A similar grater element 618 is indicated one end of each of openings 609 on dotted circle 609, but at an opposite end to those of openings 608. FIG. 7B is a magnified view of one opening 608 having a grater element 618, and FIG. 7C is a side elevation section view through opening 608 of FIG. 7B, taken along section line 7C-7C of FIG. 7B. Grater element 618 is seen to be, in this example, a planar region raised by a dimension "d" above floor 613. Edge 619 is a machined, sharp edge, so raised greater elements 618 may provide a grating effect on material as the cutting elements are rotated relative to one another.

In some embodiments, grater elements may be implemented on both ends of some openings, and on one end of some openings, and some openings will not have grater elements 618.

Figure 7D:
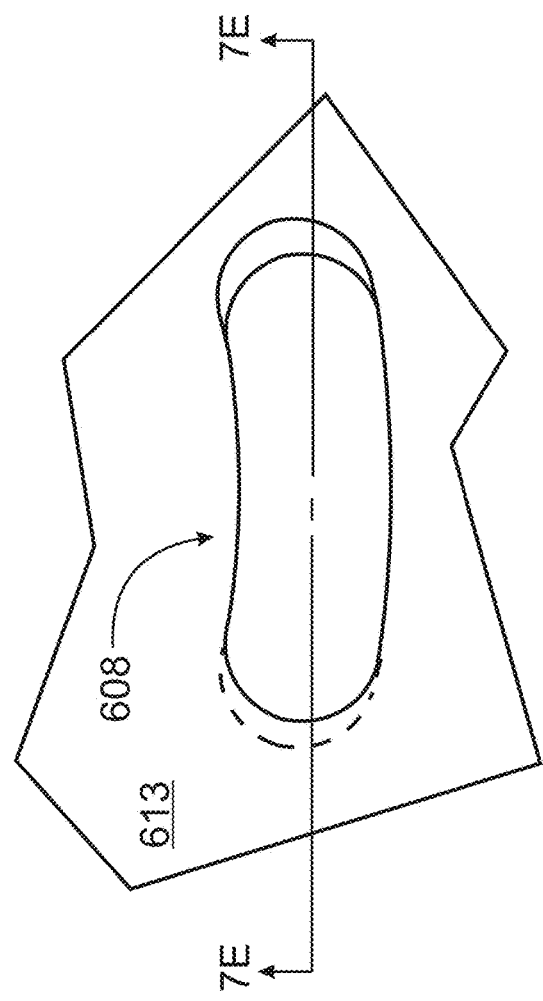
FIG. 7D is a plan view of an opening illustrating a slanted passage in an embodiment of the present invention.
Figure 7E:
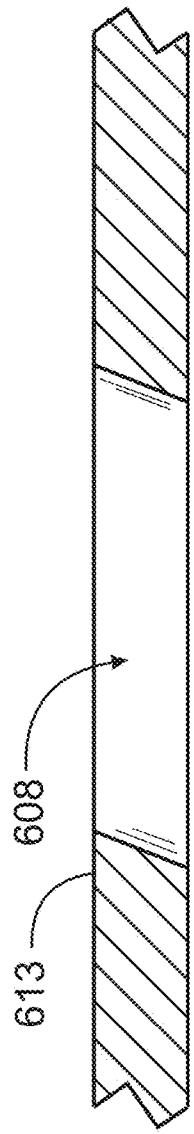
FIG. 7E is a side elevation view of the opening of FIG. 7D taken along section line 7E-7E of FIG. 7D.

FIG. 7D and FIG. 7E illustrate yet another detail that may be implemented in embodiments of the invention. Opening 608 is illustrated in FIGS. 7D and 7E as passing through floor 613 at an angle, rather than vertically. The side walls of opening 608 in this example are vertical, but the walls at the rounded ends are at an angle to vertical. This creates a scooping action as the upper and lower cutting elements are rotated relative to one another, at least in one direction. Again, this feature may be implemented on individual ones of openings in a lower cutting element, and not on all openings.

Referring again to FIGS. 4 and 6 it may be seen that blades extending from the floor of either cutting element are located substantially in a semicircle on one side of the floor of the cutting element, leaving a region in each that is about one-half of the overall area of the floor, that is empty, that is, having no blades. The order of increasing height for the blades in each cutting element follows the position around the radius of each group of blades. The blades next to the clear area, described above as a crush-free zone, are the shortest, the next blades in either rotary direction are of incrementally greater height, and the next higher, and so forth.

FIG. 8A is a section view of lower cutting element 601 taken along section line 8-8 of FIG. 7, and FIG. 8B is a plan view of the lower cutting element in the direction opposite of the plan view of FIG. 7. The detail of FIG. 8 is into the well 802 beneath floor 613. Referring to FIG. 8A, elements 801 are three inclined engagement elements implemented on the inner diameter walls of well 802. These inclined engagement elements are essentially short portions of threads on three places on the inner wall equally spaced at 120 degrees. Similar engagement elements are implemented on outer diameters of catching chamber 602, as is described below, and the engagement elements on the lower cutting element and the catching chamber engage and retain the two parts together.

FIG. 9A is an elevation view of capture chamber 602 disengaged from other elements of the herb grinder in one embodiment of the invention. FIG. 9B is a section view of the capture chamber taken along section line 9B-9B. An important and novel aspect of the catching chamber in this embodiment of the invention is that capture chamber 601 has engagement interfaces 901 and 902 having engagement elements 903 in three places around the periphery of each interface, similar to the engagement elements 801 of lower cutting element 601, that are placed and shaped to engage elements 801 of the lower cutting element. The shape and placement is such that catching chamber 602 may be assembled to the lower cutting element with either interface 901 or 902. That is, the catching chamber may be engaged in one orientation, and then may be disengaged and flipped over, and re-engaged. The catching chamber may be assembled with either end up.

In many embodiments catching chamber 601 has a fine-mesh screen (not shown) across the axis of the chamber at the height of shoulder 904. A purpose of this screen is to allow very fine particles, such as pollen, to pass through to a lower collection chamber described below with reference to FIGS. 10A, B and C.

Figure 10C:
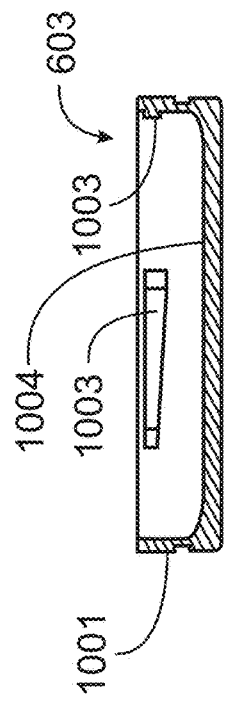
FIG. 10C is a section view of the lower catching chamber of FIGS. 10A and 10B taken along section line 10C-10C of FIG. 10A.
Figure 10B:
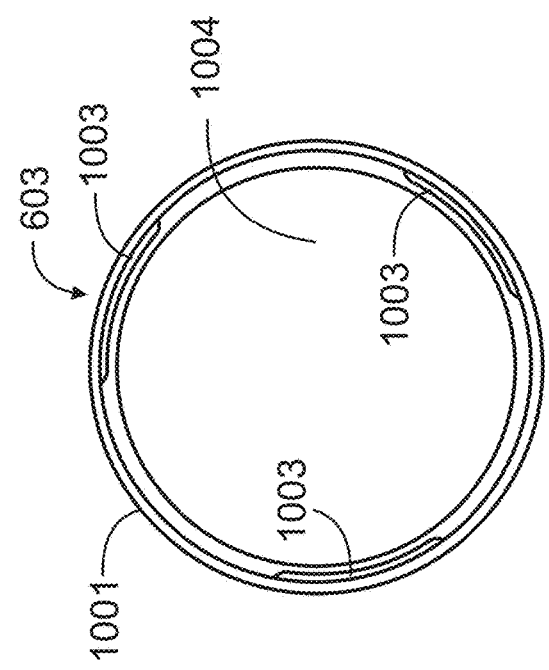
FIG. 10B is a plan view directed into an open end of the lower catching chamber of FIG. 10A.
Figure 10A:
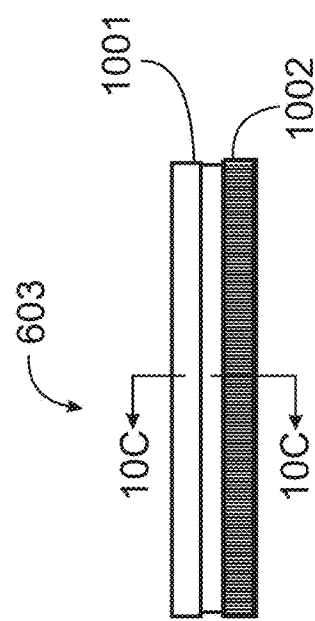
FIG. 10A is an elevation view of the lower catching chamber of FIG. 6, disengaged from other elements in an embodiment of the invention.

FIG. 10A is a side elevation view of lower catching chamber 603 of FIG. 6, that may be considered a pollen collection chamber. Lower catching chamber 603 has an engagement interface 1001 in the form of a cylindrical body, and a finely knurled region 102 enabling a secure grip for a user in operation.

FIG. 10B is a plan view into the engagement cylinder 1001 of the lower catching chamber illustrating a floor 1004 and three engagement elements 1003 positioned around an inner diameter wall of body 1001. Engagement elements 1003 are inclined planes similar to engagement elements 903 described above with reference to FIGS. 9A and 9B. When catching chamber 602 is engaged to the lower cutting element 601 by virtue of engagement of interface 901 and engagement elements 903 with engagement elements 801 of the lower cutting element, lower catching chamber may be engaged to the catching chamber by engagement elements 1003 engaging with engagement elements 903 of interface 902. As described above, however, catching chamber 602 may be reversed, so interface 901 is below, and the lower catching chamber may still be engaged to the lower catching chamber. The reversibility of catching chamber 602 is a unique aspect of an herb grinder in an embodiment of the present invention.

A Crush-Free Zone

The inventor in the instant case is aware of a problem common to just about every herb grinder apparatus in the conventional art. The arrangement of the teeth and the means by which the grinder or cutting elements engage requires that material to be ground be placed into, typically, the lower grinder element onto the upwardly-extending teeth. Then a user must engage the upper grinder element to the lower grinder element. The material to be shredded is necessarily, in just about all cases, of a volume more extensive than any space between teeth of the grinder elements. Therefore, the user must place the material onto the teeth, and smash the material down between the teeth. Then the upper grinder element is engaged, which further crushes the material before any shredding action begins. This crushing is not desirable. A loading process that avoids completely any crushing effect would generally produce a superior ground product.

Referring again to FIGS. 4 and 5, it is seen that, in some embodiments of the invention, in upper cutting element 401 all of the blades are in one semi-circle of floor 406, and the other semicircle has no blades. Similarly, referring to FIGS. 6 and 7 the same is true. All blades are limited to one half of the floor, in one semi-circle. Further, inner groove 405 with entry openings 404a and 404b, having different size, and projections 614a and 614b on body 605 of lower cutting element 601, ensure that the upper and lower cutting elements can only be initially engaged with regions without blades of the two cutting elements facing one another. This unique arrangement enables a user, with the upper cutting element removed, to place material to be processed into the lower cutting element in the region without blades. There is no crushing effect in this loading operation. Then, the upper cutting element may be engaged to the lower, but groove 405 and the openings and the key elements 614a and 614b ensure that the blade-free region of the upper cutting element will match with the blade-free region of the lower cutting element as the two cutting elements are engaged, so there will be no crushing effect in the engagement step as well.

In some embodiments, to further enhance the crush-free zone, the depth of the upper and lower cutting elements may be increased beyond the depth of such elements in the conventional art. In the prior art this depth is typically on the order of twelve to thirteen mm. In one embodiment of the instant invention this depth may be as much as 24 mm or greater. In various embodiments that have such additional depth, for the purpose of avoiding inadvertent crushing of product, the height of blades may be adjusted as well.

Figure 11A:
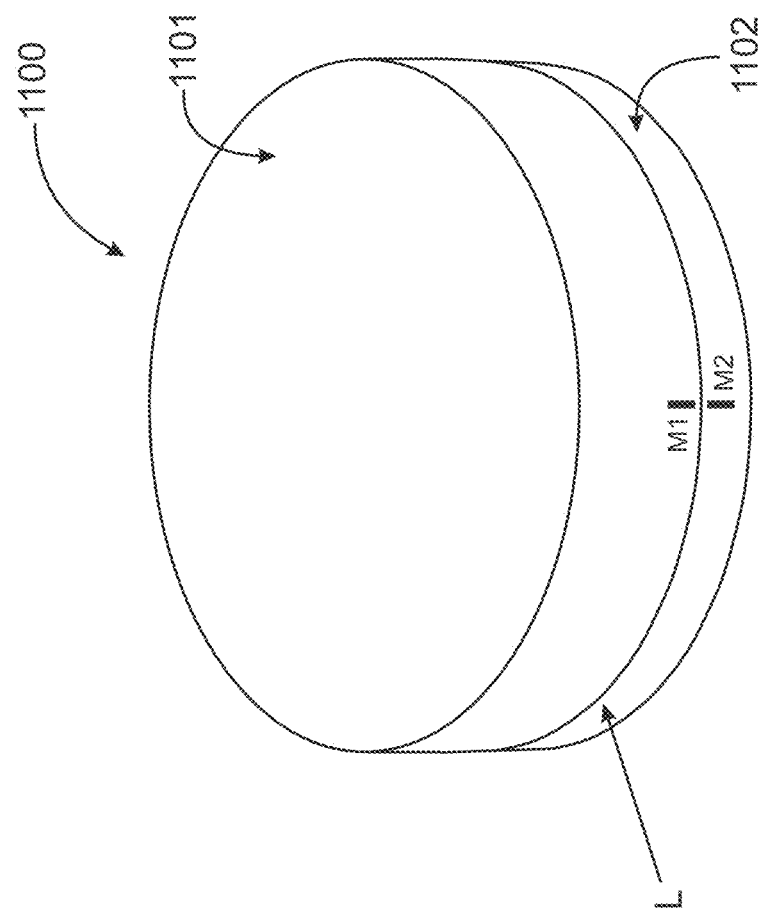
FIG. 11A is a perspective view of a herb grinder in another embodiment of the present invention.

FIG. 11A is a perspective view of yet another embodiment of the invention comprising an upper rotary cutting element 1101 engaging a lower rotary cutting element 1102. Line L is a parting line where the upper element meets the lower cutting element. The elements are separable.

Figure 11B:
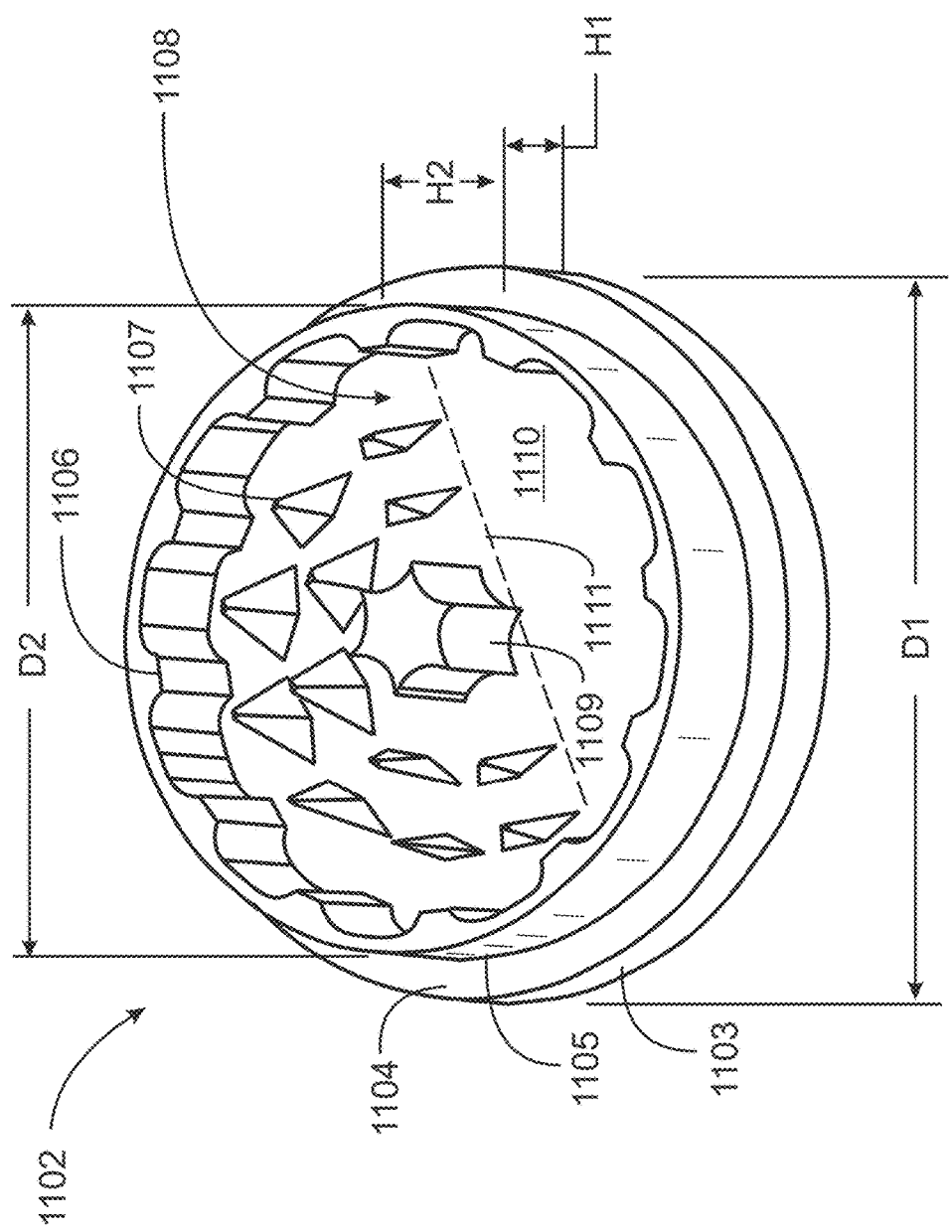
FIG. 11B is a perspective view of a lower rotary cutting element of the herb grinder of FIG. 11A.

FIG. 11B is a perspective view of lower rotary cutting element 1102 of FIG. 11A with upper cutting element 1101 removed. Lower cutting element 1102 has a base 1103 with a diameter D1 and height H1 with a planar top rim 1104. A wall 1105 extends upward from base 1103 with a height H2 with a diameter D2 and has a cylindrical outer surface. The wall surrounds an inner volume having a floor 1108 at about the height of rim 1104. There is a central star-shaped extension 1109 analogous to extension 612 described above with reference to another embodiment of the invention. Extension 1109 projects upwardly from the floor at the center of the lower cutting element and has star points that aid in shredding and cutting in use.

An inner surface of wall 1105 has a plurality of regularly spaced somewhat rounded extensions 1106 providing an irregular inner surface that helps to stir and mix material in operation. In some embodiments these extensions may have rounded vertical edges and in some the edges may not be rounded.

There are a plurality of cutting blades 1107 extending upward from floor 1108 in this embodiment. Blades 1107 are analogous to blades 408 through 411 and blades 610 and 611. Blades 1107 may have the shape and structure of blades described above with reference to FIGS. 5A through 5C. In different embodiments blades 1107 may have sharpened edges, may be of different heights in some embodiments and may have serrated edges in some embodiments, as has been described above.

Figure 11C:
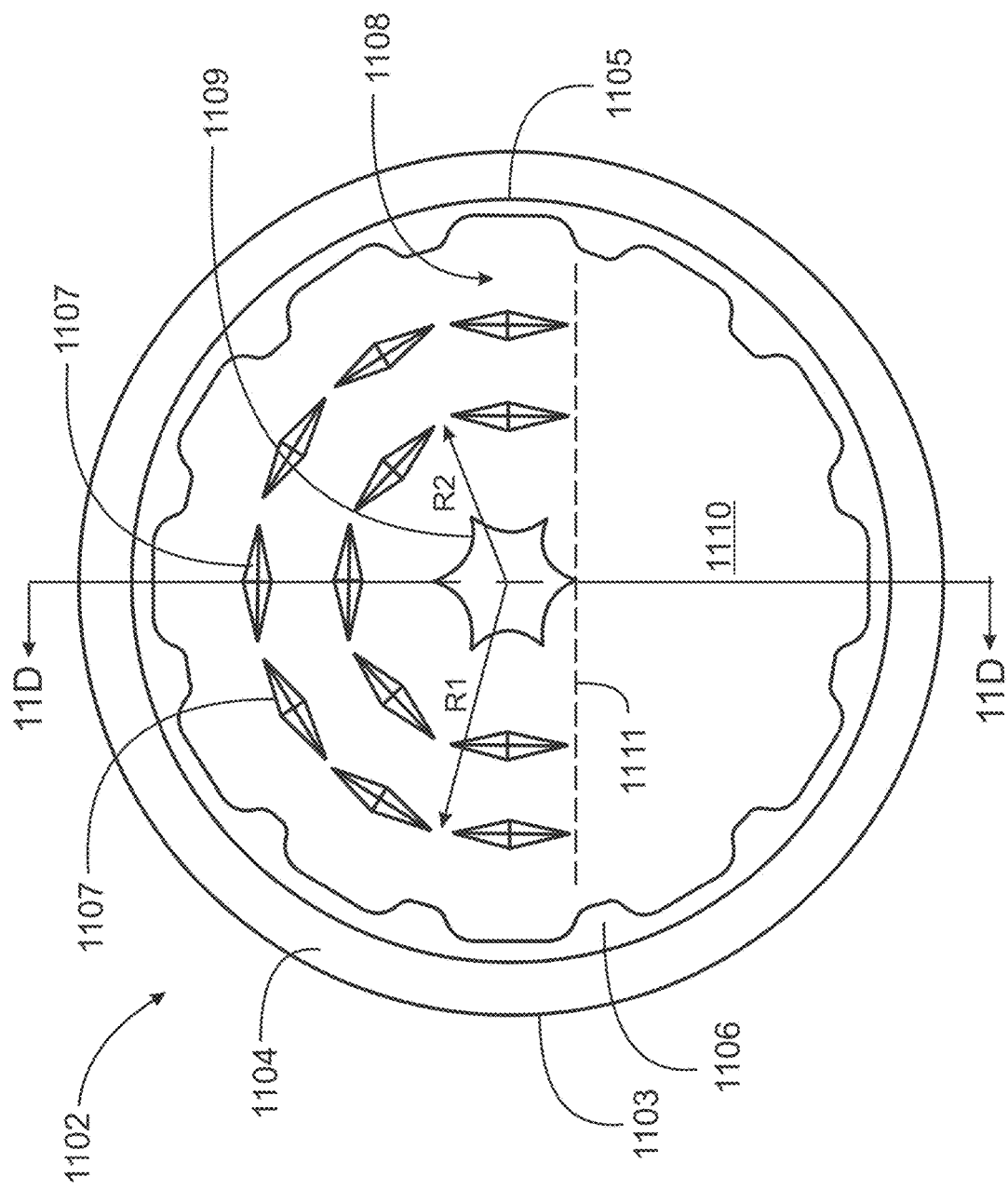
FIG. 11C is a top plan view of the lower rotary cutting element of FIG. 11B.

FIG. 11C is a plan view of lower rotary cutting element 1102 showing more detail of wall 1105 and particularly placement of blades 1107. In this example there are a total of 12 blades, seven equally spaced along a radius R1 and five equally spaced along a radius R2. A dotted straight line 1111 (not a part of the structure) is shown extending across floor 1108 abutting one star point of extension 1109 and touching a leading edge of four blades. This dotted line is a boundary of a region 1110 of floor 1108 that is meant to have no blades. Seven blades 1107 on radius R1 are equally spaced along r1 from line 1111 back to line 1111, all on one side of line 1111.

Figure 11D:
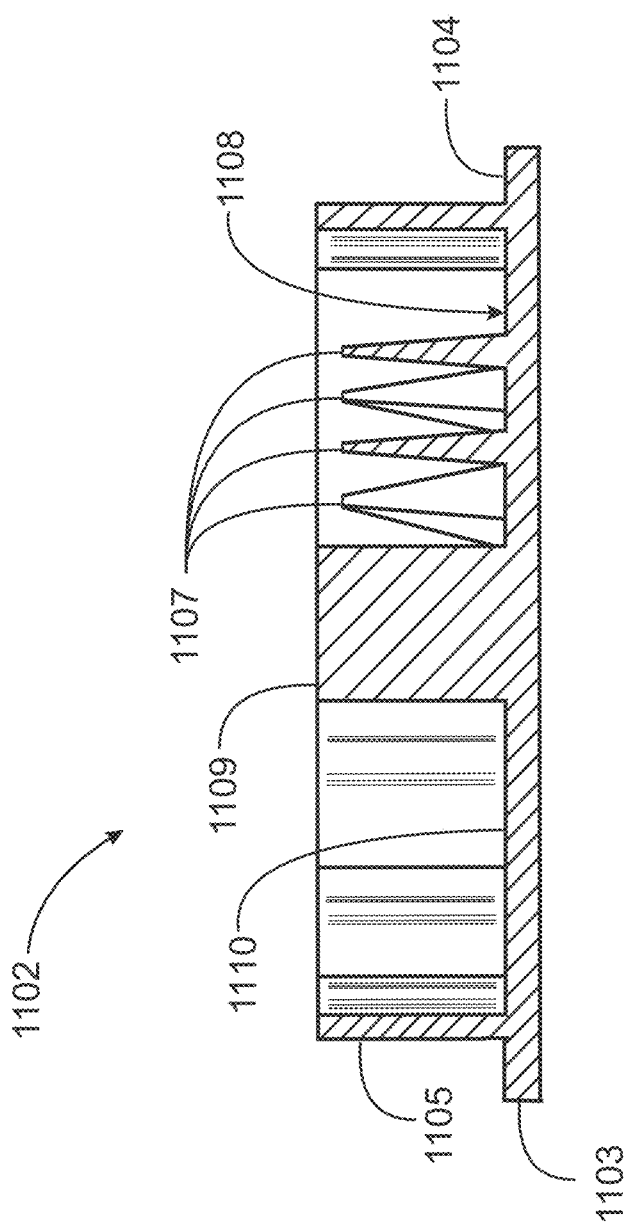
FIG. 11D is a section view taken through the lower rotary cutting element of FIG. 11C taken along section line 11D—11D in FIG. 11C.

FIG. 11D is an elevation cross section of lower cutting element 1102 taken along section line 11D-11D of FIG. 11C. The section passes through the center of center extension 1109 and through two cutting blades 1107. Other cutting blades may be seen behind the blades that are sectioned. Region 1110 of floor 1108 may be seen completely devoid of cutting blades. Region 1110 is somewhat less than half of the total floor area as may be seen also in FIGS. 11B and 11C.

Figure 12A:
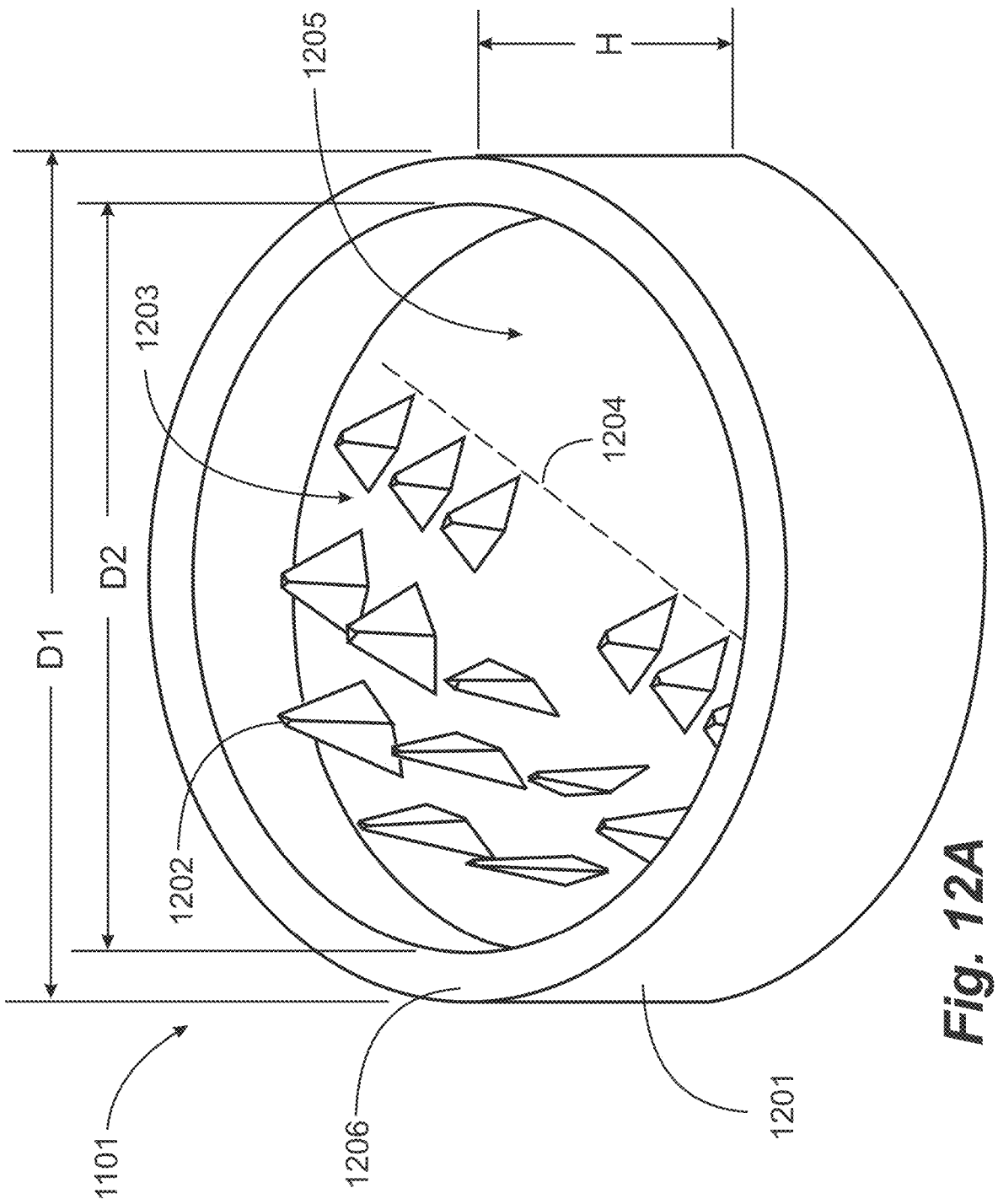
FIG. 12A is a perspective view of an upper cutting element of the grinder in FIG. 11A.

FIG. 12A is a perspective view of upper cutting element 1101 of FIG. 11A. Upper cutting element 1101 is in the shape of a cylinder 1201 of outer diameter D1 with an inner diameter D2, the cylinder closed on one end and having an annular surface 1206 at the open end. Outer diameter D1 is the same dimension D1 as in FIG. 11B for lower cutting element 1102. Inner diameter D2 is substantially the same as diameter D2 of lower cutting element 1102 in FIG. 11B but is in this example at least a few thousandths of an inch greater than D2 in FIG. 11B, enabling upper cutting element 1101 (turned upside down from the view of FIG. 12) to be engaged to lower cutting element 1102 by the inner diameter D2 of 1200 slipping down over wall 1105 until annular surface contacts rim 1104 of lower cutting element 1102, a circumstance depicted in FIG. 11A.

Upper cutting element 1101 has a plurality of cutting blades 1202 implemented extending from a floor 1203. There are in this example fifteen blades 1202 arranged on three radii, seven blades on an outermost radius, five on an intermediate radius and three on an innermost radius. The fifteen blades are all in a region to one side of a line 1204, and there are no blades in a region 1205 to an opposite side of line 1204.

Figure 12B:
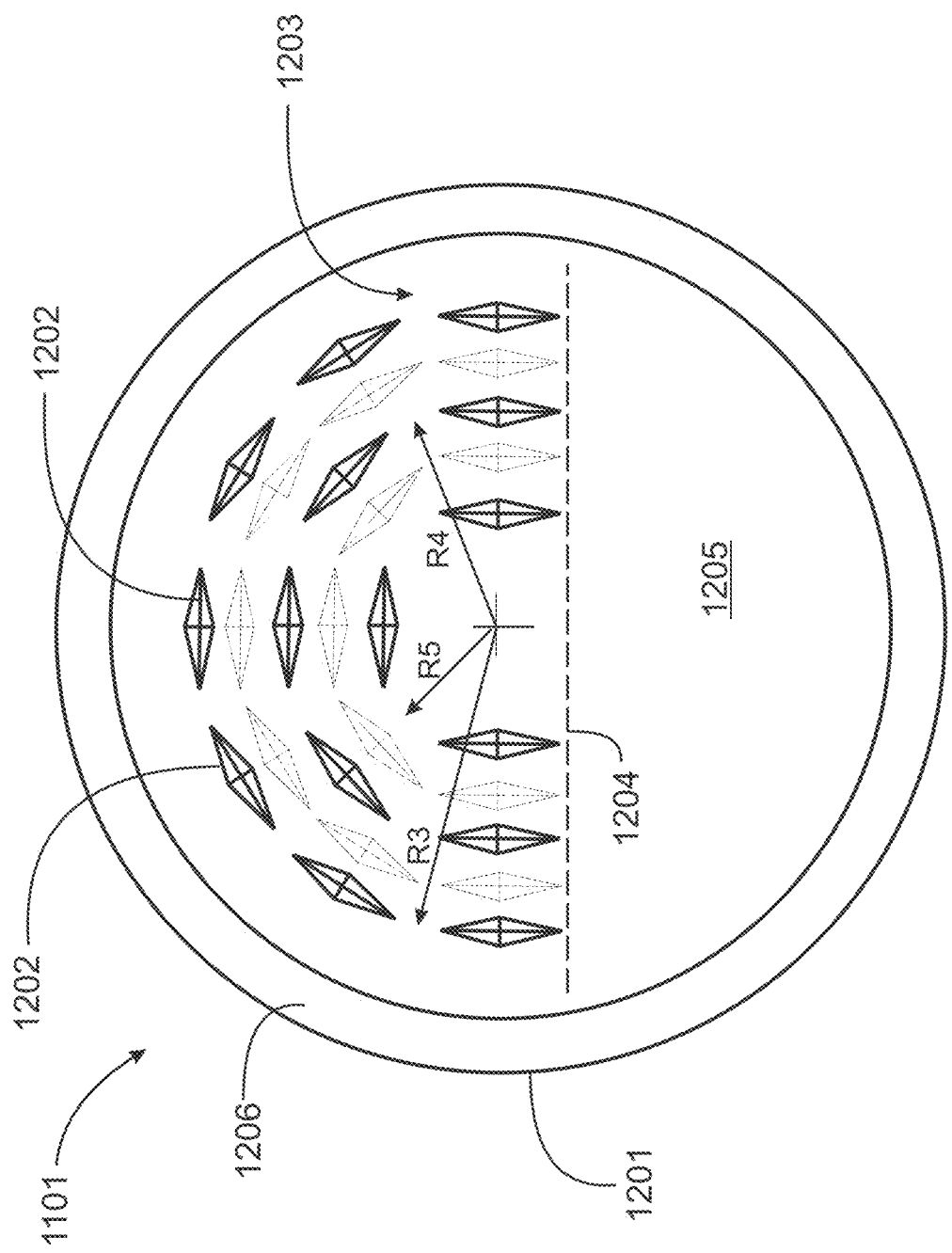
FIG. 12B is a plan view of the upper cutting element of FIG. 12A.

FIG. 12B is a plan view of upper cutting element 1101 showing the arrangement and positioning of the 15 blades 1202 on the floor 1203, projecting into the volume enclosed by cylinder 1201. Seven blades 1202 are implemented on a radius R3, equally spaced along the radius from line 1204 back to line 1204. Five blades are implemented equally spaced on a radius R4 from line 1204 back to line 1204. Three blades are implemented equally spaced on a radius R5 from line 1204 back to line 1204. All blades on a region of floor 1203 to one side of line 1204. No blades are implemented in region 1205 to the opposite side of line 1204.

Positions of blades 1107 in lower cutting element 1102 as seen in FIG. 11C are shown in FIG. 12B with dotted lines in hairline weight. It may be seen that R3 is greater than R1 and R4 is less than R1 but greater than R2, while R % is less than RR2. A result of these circumstances is that with the upper cutting element engaged to the lower cutting element as described above, the rows of blades of the upper cutting element pass between the rows of blades of the lower cutting element.

It has been described that there are no blades in region 1110 of lower cutting element 1102, as seen in FIG. 11C, and there are no blades in region 1205 of upper cutting element 1101. Regions 1110 and 1205 are of the same dimension and areal extent, although this is not a strict limitation in embodiments of the invention. An important purpose of this circumstance is that with the upper and lower cutting elements disengaged as shown in FIGS. 11C and 12B a user may place a *Cannabis* bud on region 1110 of the lower cutting element. The user may then turn upper cutting element 1101 upside down, being careful to locate region 1205 over region 1110, and engage the upper cutting element fully to the lower cutting element, that is, until annular surface 1206 contacts rim 1104. In the engagement no teeth will contact the *Cannabis* bud, and there will be no crushing of the bud. The regions without teeth have created a crush free zone. In this operation alignment of the regions without teeth is accomplished manually and by sight.

After the engagement with the bud in place and the blade free regions aligned the herb grinder 1100 appears as in FIG. 11A. The user may at this point grasp the lower cutting element with one hand and the upper cutting element with the other hand, and rotate the elements relative to one another, causing the blades of the two elements to pass in close proximity and to shred the *Cannabis* bud, after which the cutting elements may be disengaged, and the shredded *Cannabis* may be emptied into any convenient container.

Figure 13A:
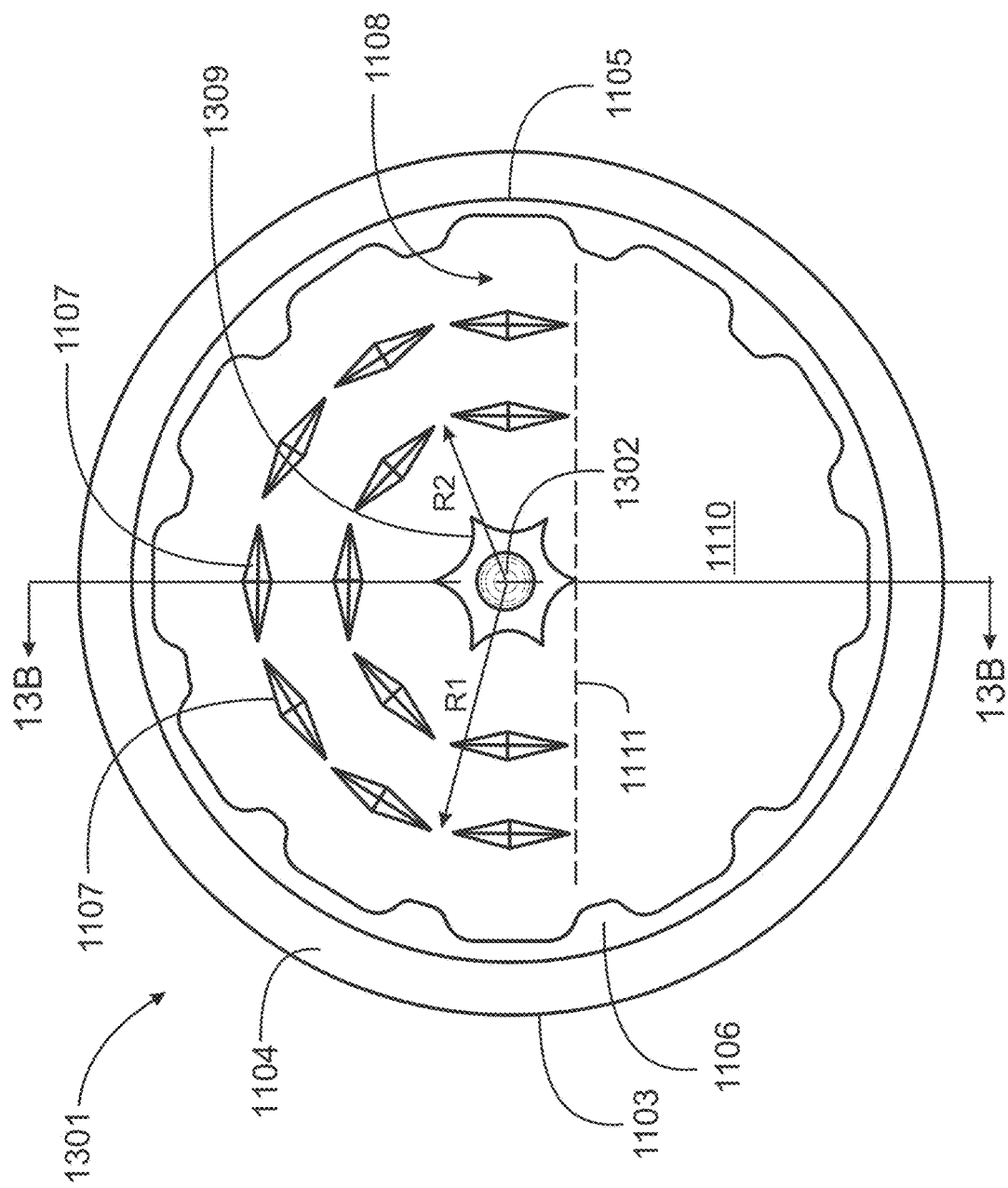
FIG. 13A is a plan view of a lower cutting element of an herb grinder in another embodiment of the invention.

FIG. 13A is a plan view of a lower cutting element 1301 of an herb grinder in another embodiment of the invention. Lower cutting element 1301 is in many ways the same as lower cutting element 1102 in FIG. 11C but differs in structure of star-shaped extension 1309, which is like extension 1109 in FIG. 11C, except for a bore at an upper end enclosing a permanent magnet 1302. Permanent magnet 1302 in this example is a cylindrical magnet with poles at the ends of the cylinder. In this example the bore is of a diameter to accept the cylindrical magnet by press fit and of a depth that the cylindrical magnet is even with a top of the start shaped extension.

Figure 13B:
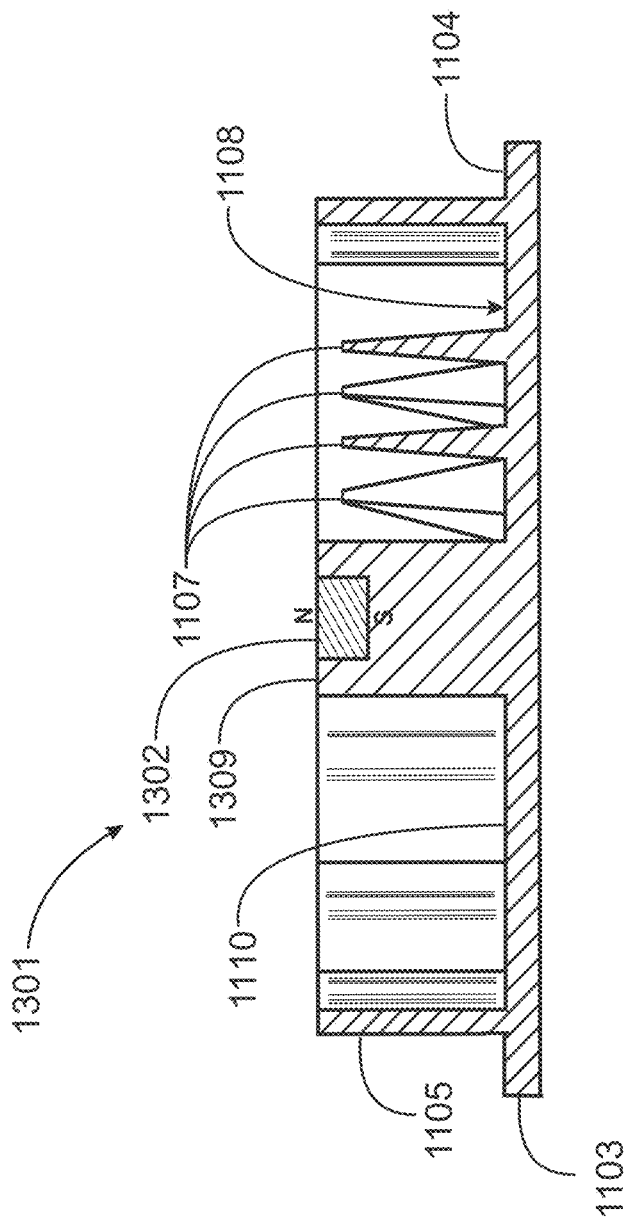
FIG. 13B is a section view of lower cutting element taken along section line 13B-13B in FIG. 13A.

FIG. 13B is a section view of lower cutting element 1301 taken along section line 13B-13B in FIG. 13A showing permanent magnet 1302 in place in a bore in extension 1309 with north magnetic pole facing upward.

FIG. 13C is a plan view of an upper cutting element 1303 of the grinder for which the lower cutting element is shown in FIG. 13A. There are fifteen cutting blades 1202 just as in upper cutting element 1101 arranged in the same pattern. A significant difference is that in upper cutting element 103 there is a permanent magnet 1304 in a bore in center of floor 1203 of cutting element 1303.

FIG. 13D is a partial section through a floor of upper cutting element 1303 of FIG. 13C showing permanent magnet 1304 embedded in a bore in the floor. The magnet is shown with south pole facing down. Referring now to FIGS. 13A and 13C, the upper and lower cutting elements may be engaged as described above for cutting elements 1101 and 1102, and when engaged magnets 1302 and 1304 will be in close proximity with opposite poles facing, providing a magnetic force urging the upper and the lower cutting elements together. This circumstance aids in keeping the cutting elements engaged.

In another embodiment of the invention a mark may be placed on the lower rim of the upper cutting element and a similar mark may be placed on the upper rim of the lower cutting element such that when the marks are aligned when engaging the cutting elements that blade free regions of the two cutting elements are also aligned. These marks are illustrated as marks M1 and M2 in FIG. 11A. The marks may be painted, scratched, etched or machined.

Figure 14B:
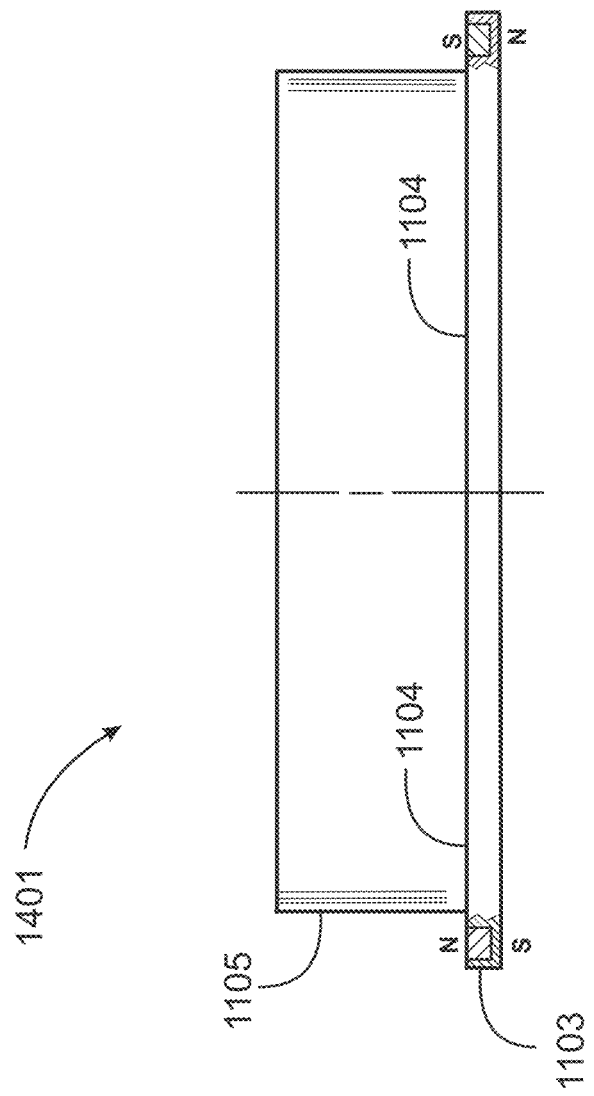
FIG. 14B is an elevation view of the lower cutting element of FIG. 14A with open end facing upward in an embodiment of the invention.

FIG. 14A is a plan view of a lower cutting element 1401 in another embodiment of the invention. Lower cutting element 1401 has all of the features of lower cutting element 1102 of FIG. 11B, and additionally has two permanent magnets 1402 embedded in rim 1104 of base 1103, diametrically opposed. FIG. 14B is an elevation view of lower cutting element 1401 with open end facing upward. A partial section is shown through the base 1103 on each side to illustrate the magnets 1402 engaged in bores in rim 1104. The bores and the OD of the magnets is such that the magnets are installed as a press fit. It may be seen that one of the magnets has the North pole facing upward and the other has the South pole facing upward.

Figure 15A:
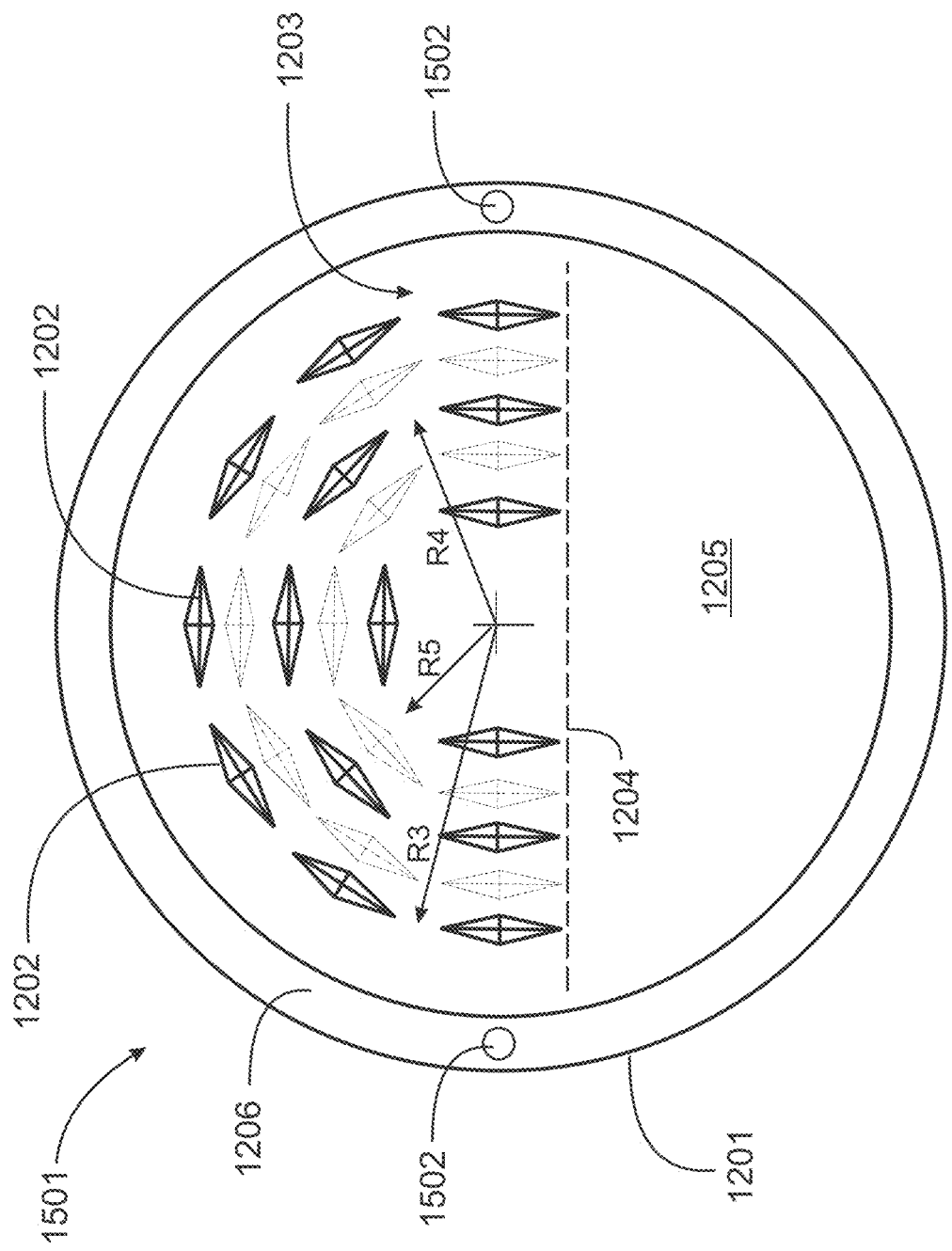
FIG. 15A is a plan view of an upper cutting element in an embodiment of the invention.
Figure 15B:
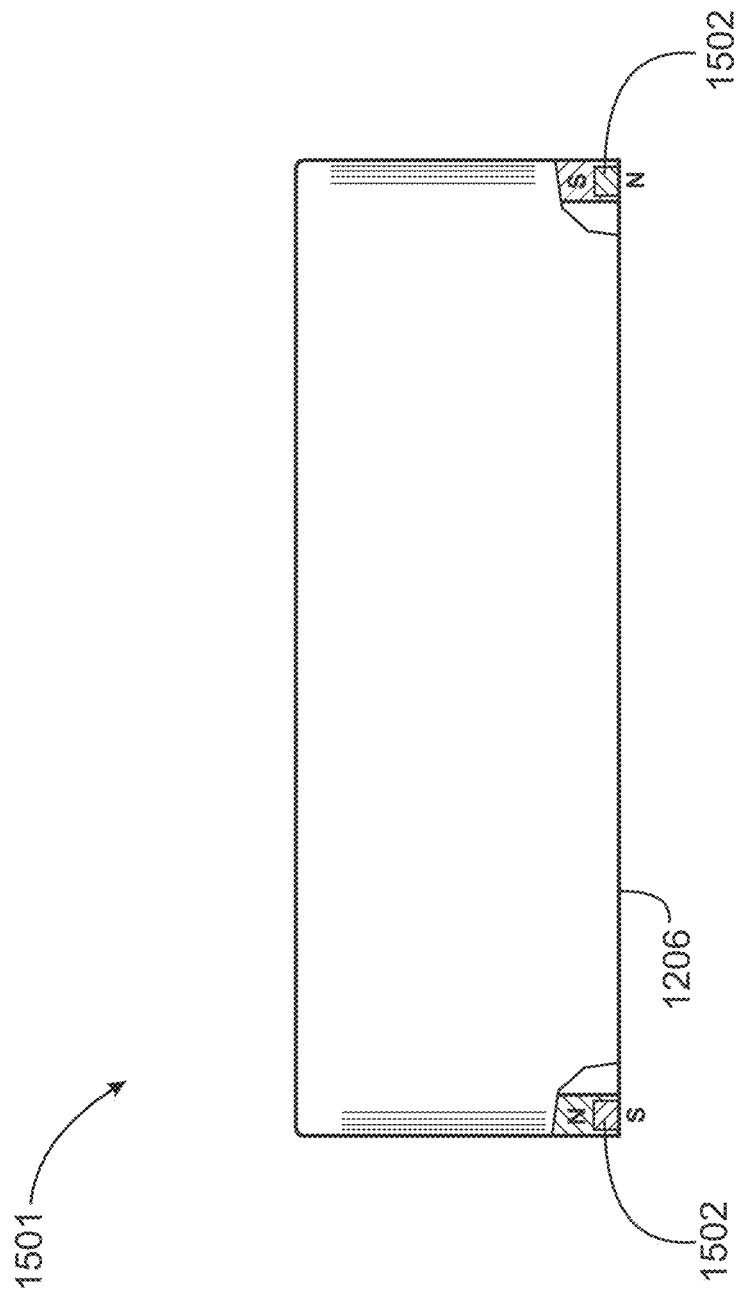
FIG. 15B is a side elevation view of the upper cutting element of FIG. 15A with open side down in an embodiment of the invention.

FIG. 15A is a plan view of an upper cutting element 1501 meant to mate with lower cutting element 1401. Permanent magnets 1502 are embedded in bores in rim 1206 diametrically opposed. FIG. 15B is a side elevation view of upper cutting element 1501 with open side down. Partial broken sections are shown through rim 1206 at the sire of each permanent magnet 1502. The magnets are press fit into the bores.

I will be apparent to the skilled person that with upper cutting element 1501 engaged with lower cutting element 1401 as in FIG. 11A, at one position in relative rotation the magnets will align with same poles facing, and at a second position of relative rotation the magnets will align with opposite poles facing. With same poles facing the cutting elements will repel one another, and with opposite poles facing the cutting elements will attract one another. The magnets are arranged such that, at the relative position that the magnets align and attract, the blade free regions of the cutting elements also align over and under.

A user may engage the upper and lower cutting elements randomly and rotate them relatively until the magnets align and attract. At that position the user may disengage the cutting elements, place a bud on the blade free zone of the lower cutting element, and re-engage the upper cutting element without further relative rotation, thereby avoiding crushing the bud.

In an alternative embodiment the magnets may be arranged such that they are not diametrically opposed, and there will be just one position where the magnets align. The magnets are pressed in the bores such that at that one position the magnets of the upper cutting element are opposed in poles to attract at that one position.

It should be apparent to the skilled person that the purpose of alignment for a crush free zone may be accomplished with just one magnet in the rims of the upper and lower cutting element, such that the magnets meet with the crush free zones aligned and with opposite poles facing. The position of the magnets around the rims may vary as long as when the magnets meet, the blade free regions align.

In another embodiment of the invention one magnet may be embedded in each rim and a magnet may be embedded on the axis of each cutting element as shown in FIGS. 13A, B and C, or two magnets (or more) may be embedded in each rime and there may be a central magnet as shown in FIGS. 13A, B and C. In this circumstance, when the cutting elements are engaged the ceterl magnets keep the cutting elements together, and the rim magnets tell the alignment of the blade free regions. There are a variety of workable combinations.

Figure 16A:
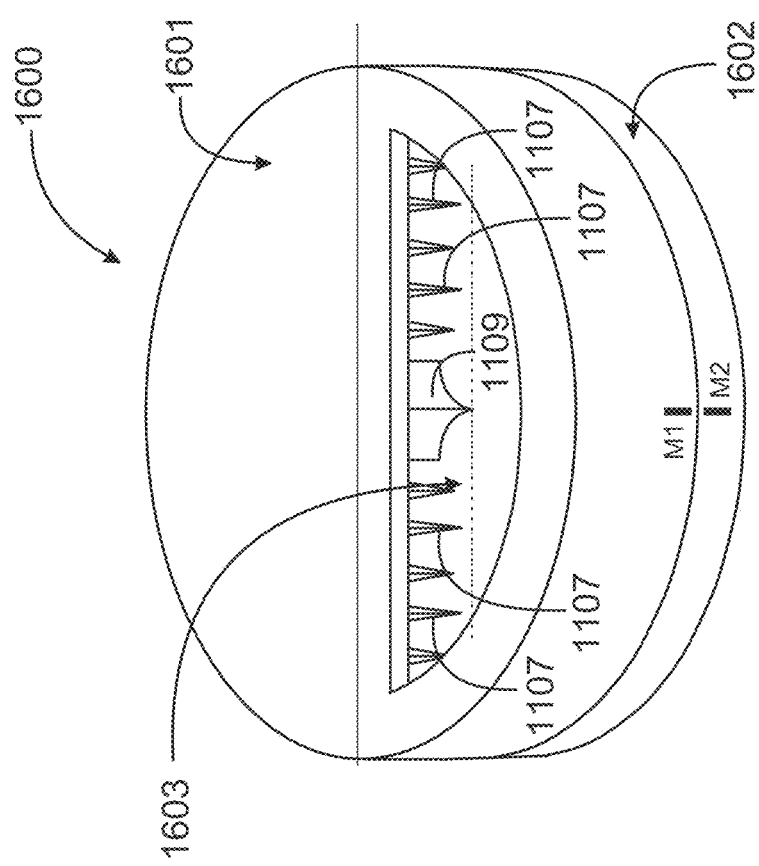
FIG. 16A is a perspective view of a herb grinder according to another embodiment of the invention.

FIG. 16A is a perspective view of a herb grinder 1600 according to an embodiment of the invention, having an opening 1603 through the top of the upper cutting element 1601, with the upper cutting element engaged to a lower cutting element 1602, at a relative rotation that the opening is aligned with the blade free region 1110 in the lower cutting element. Opening 1603 is implemented exactly in the shape of what would be the blade free region in the upper cutting element. Because of the perspective view, star-shaped extension 1109 may be seen on the floor of the lower cutting element and blades 1107 from both the lower and the upper cutting element are seen as well.

Figure 16B:
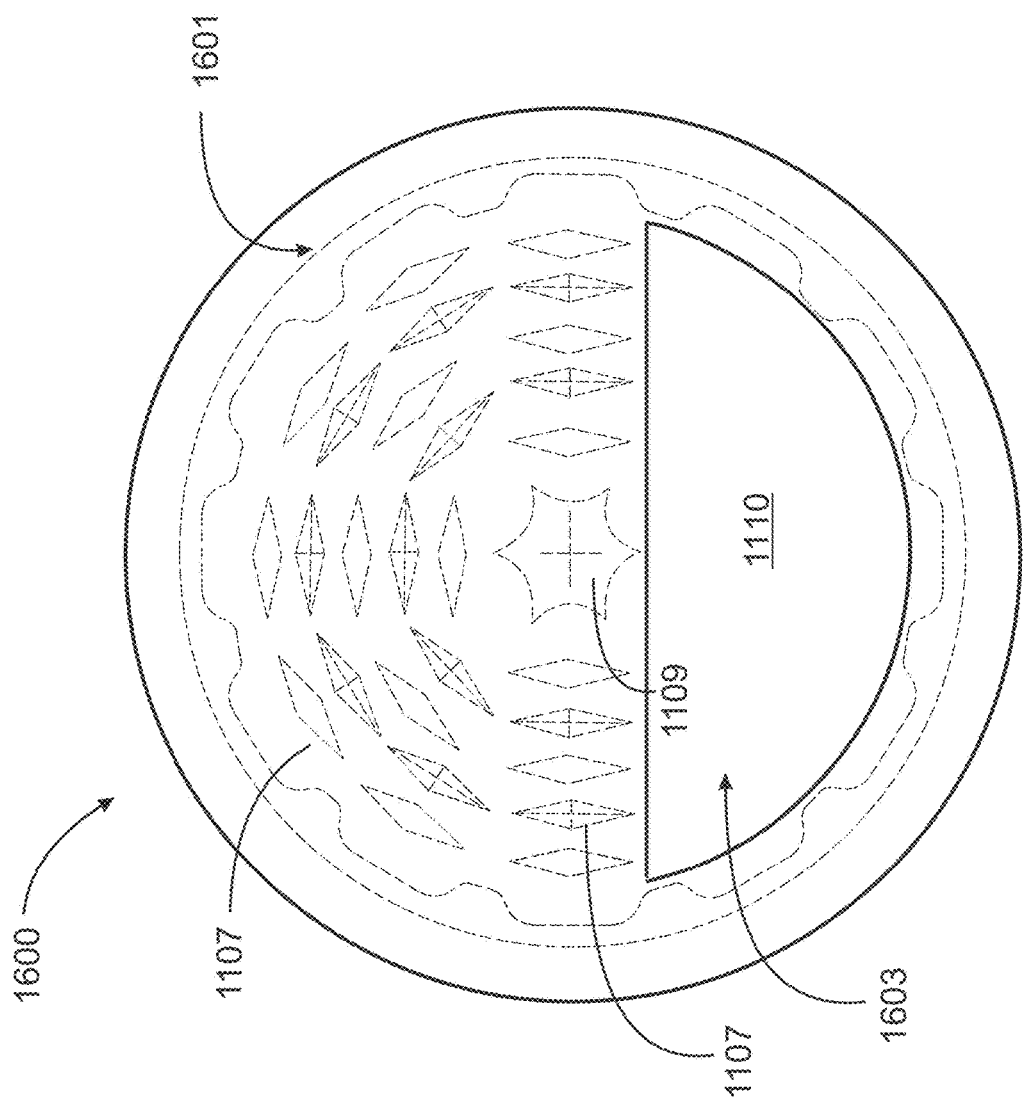
FIG. 16B is a plan view from above of the herb grinder of FIG. 16A in an embodiment of the invention.

FIG. 16B is a plan view from above of the herb grinder 1600 of FIG. 16A. In this view all of the blades of the cutting element, the scalloped inside edge of the lower cutting element, and the star-shaped extension are shown in dotted relief. Opening 1603 and blade free region 1110 of the lower cutting element are seen to align.

In the embodiment of FIGS. 16A and 16B use may align the upper and lower cutting elements by the marks M1 and M2, or just by sight, and place a bud through opening 1603 onto blade free zone 1110. This action may be accomplished with no crushing of the bud. Then the user may rotate the upper and lower cutting elements relative to one another and shred the bud efficiently with the mating blades. After shredding the user may manipulate the grinder to move the shredded material to the blade free zone of the lower cutting element under the opening and may turn the grinder over to empty the shredded material into any other container.

In different embodiments there may magnets in the center as in FIGS. 13A and B to aid in keeping the elements engaged, in the rims as in FIGS. 14A and B as an aid in alignment, or both, or any combination deemed desirable.

Figures 17A, 17B:
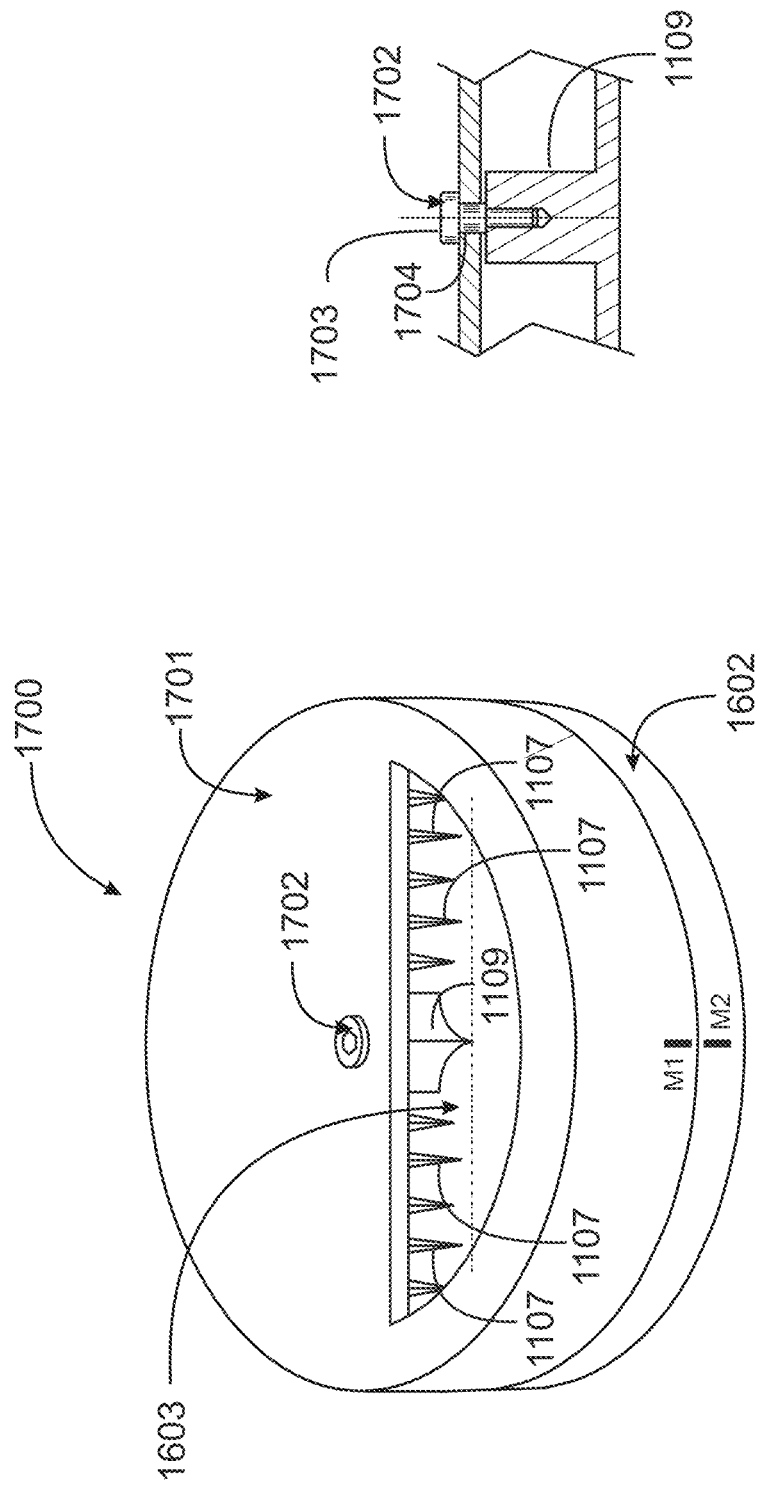
FIG. 17A illustrates a grinder like that of FIGS. 16A and B, with a special fastener through the top of upper cutting element in an embodiment of the invention.
FIG. 17B is a partial section view of the grinder of FIG. 17A showing the fastener engaged into a threaded hole.

FIG. 17A illustrates a grinder 1700 like that of FIGS. 16A and B, but with a special fastener 1702 through the top of upper cutting element 1701, in the center, engaged into a threaded hole in star-shaped extension 1109 of the lower cutting element. FIG. 17B is a partial section view showing fastener 1702 engaged into a threaded hole in star-shaped extension 1109. Fastener 1702 has a head 1703, in this example with a hex opening for a hex wrench, and a region 1704 of a length slightly longer than the thickness of the top of the upper cutting element. With fastener 1702 engaged through the top of the upper cutting element the upper and lower cutting elements may be freely rotated and are constrained to remain fully engaged. A user may align opening 1603 with the blade free region 1110 of the lower cutting element, place a bud through the opening without any crushing of the bud, and rotate the cutting elements relative to one another to shred the bud. The shredded material may be emptied through opening 1603, and a new bud placed when desired. Fastener 1702 may be disengaged as needed to part the cutting elements for cleaning.

The location and shape of blade free regions and of openings in the upper cutting element as illustrated and described thus far are not limiting to the scope of the invention. Shapes and locations of blade free regions and opening may take other forms. It is only necessary that the blade free regions be of a shape and an extent to accommodate a bud without crushing.

FIG. 18A illustrates a grinder 1800 with an upper cutting element 1801 with an opening 1803 and a lower cutting element 1802 engaged and constrained in engagement by a fastener 1702. Opening 1803 has an apex near element 1109 and two sides radiating with an included angle in this example of about sixty degrees, with an arcuate side along the outer diameter of the upper cutting element. The included angle might be greater or smaller, such as ninety degrees. The embodiment illustrated in FIG. 17A has an included angle of 180 degrees. FIG. 18B shows again the engagement by fastener 1702.

Figure 18C:
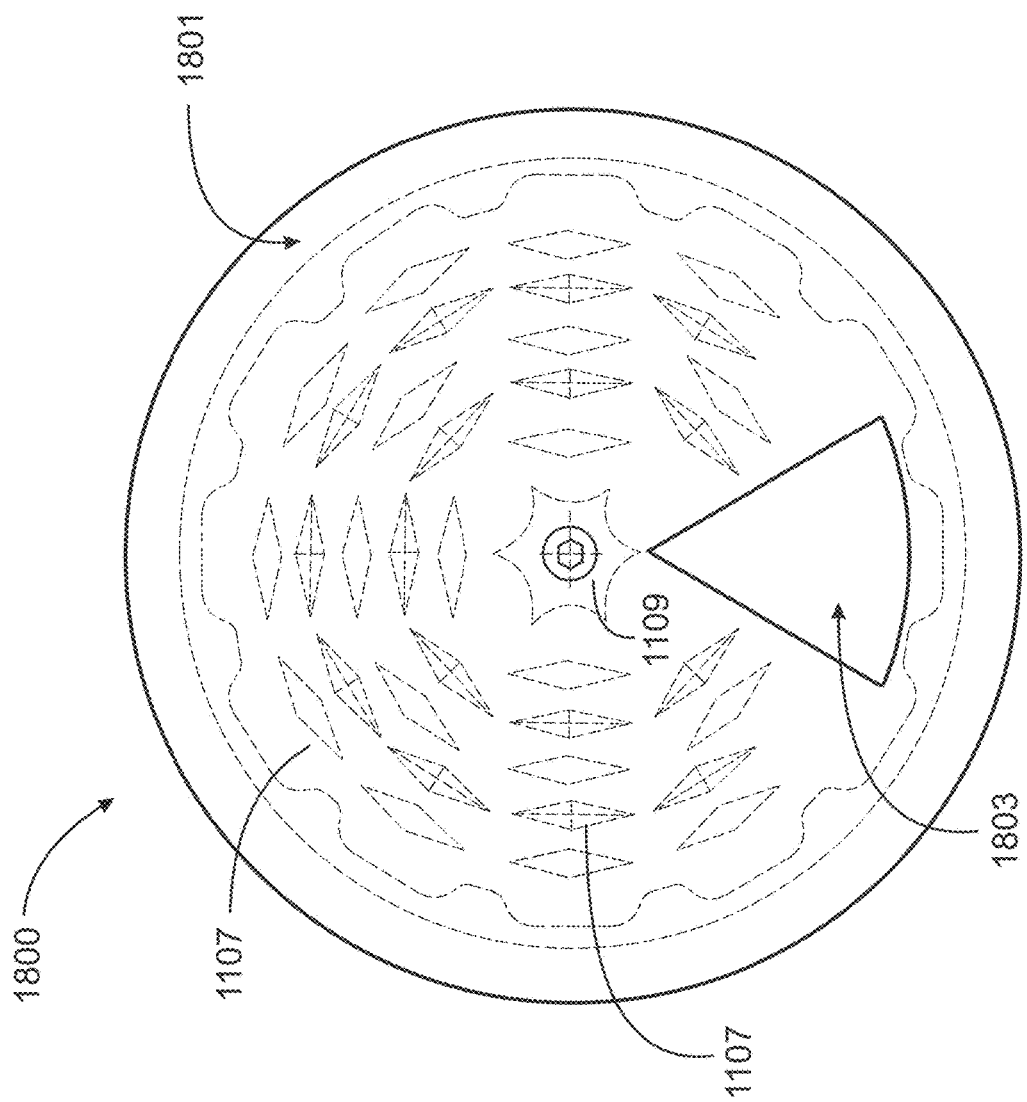
FIG. 18C is a plan view from above of the grinder of FIG. 18A illustrating the shape and placement of an opening and a blade free region of the lower cutting element in an embodiment of the invention.

FIG. 18C is a plan view from above of grinder 1800 of FIG. 18A illustrating the shape and placement of opening 1803 and the blade free region of the lower cutting element. It may be seen in FIG. 18C that four additional blades are implemented both on the upper and the lower cutting element.

Figure 19:
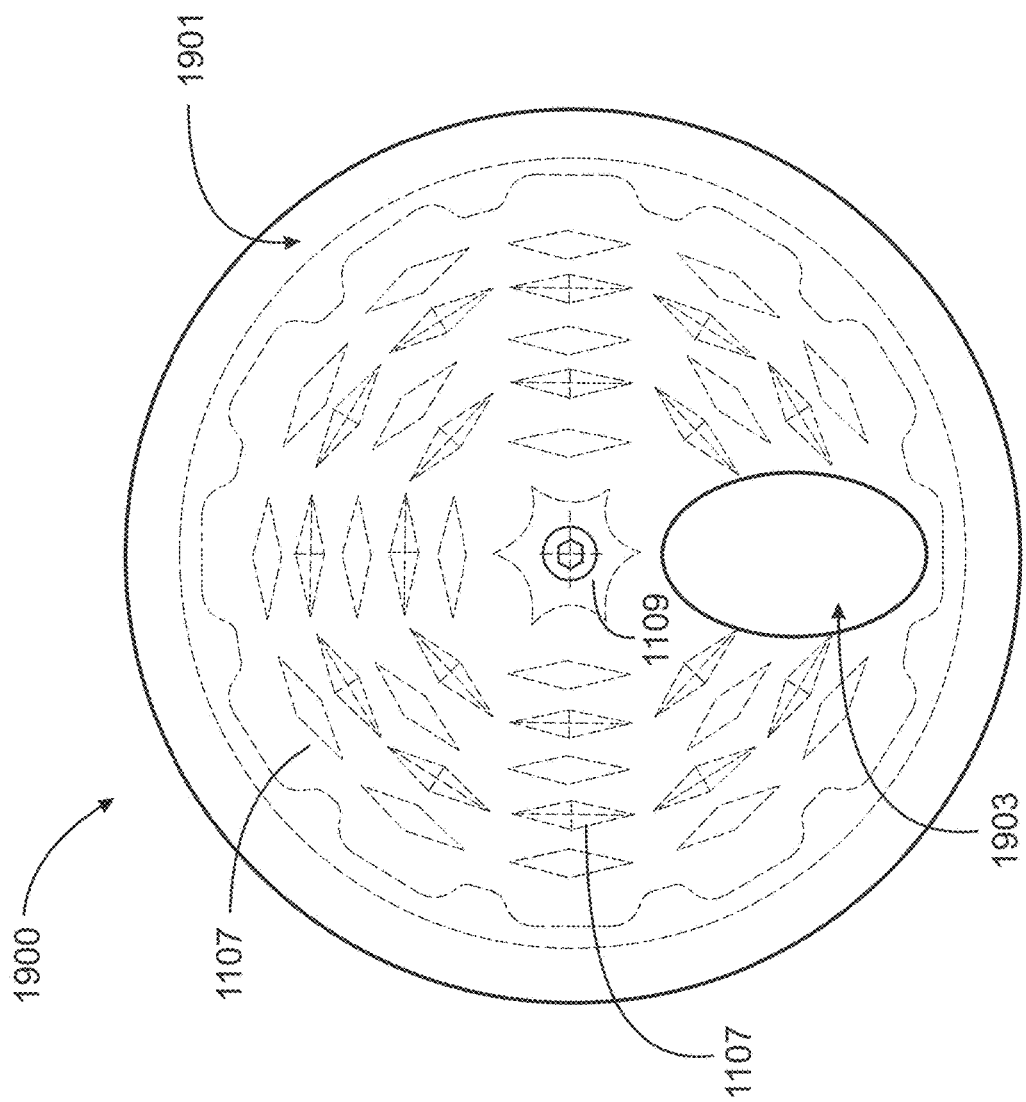
FIG. 19 is a plan view of yet another herb grinder having an upper cutting element with an oval shaped opening in an embodiment of the invention.

FIG. 19 is a plan view of yet another herb grinder 1900 having an upper cutting element with yet another opening, in this case an oval shaped opening. This allows more blades on both the upper and the lower cutting elements.

It will be apparent to the skilled person with the examples illustrated and described that openings may be implemented with many different shapes and sizes to suit different desires for an herb grinder in embodiments of the invention.

Figure 20B:
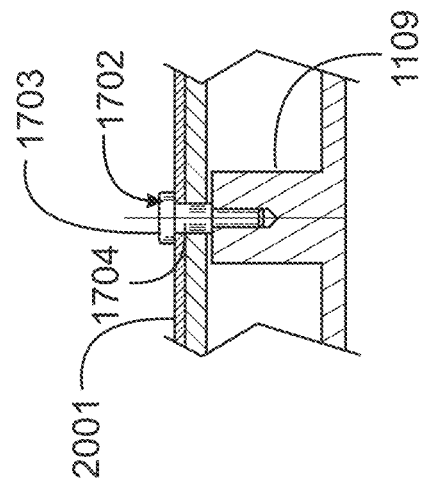
FIG. 20B illustrates the upper cutting element and the cover of the grinder restrained by a fastener in an embodiment of the invention.
Figure 20A:
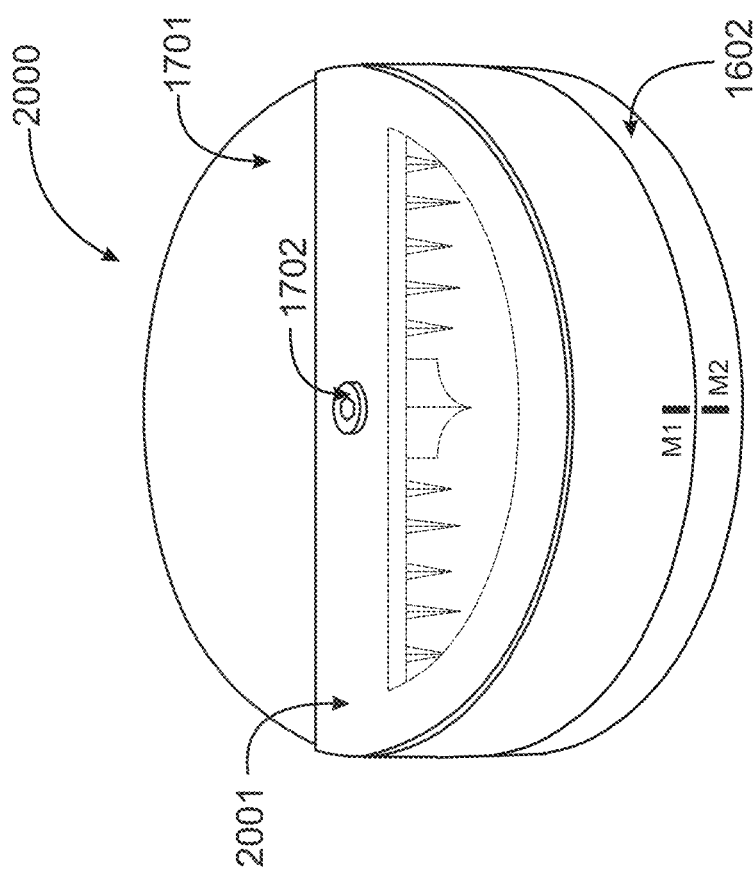
FIG. 20A is a perspective view of yet another herb grinder in an embodiment of the invention.

FIG. 20A is a perspective view of yet another herb grinder 2000 in an embodiment of the invention. Grinder 2000 is the same as grinder 1700 except for a rotating cover 2001 that in this example has the diameter of upper cutting element 1701. In one embodiment cover 2001 is implemented in sheet metal, such as aluminum sheet, but may be of any other suitable material. Cover 2001 is more than a semi-circle but ends at edge 2002 just beyond a hole through which fastener 1702 passes. FIG. 20B illustrates that fastener 1702 in this example has a region 1704 longer in this example than in the example of FIG. 17B by the thickness of the cover 2001. Both upper cutting element and cover 2001 may rotate around fastener 1702 either together or separately.

It will be apparent to the skilled person that covers may be fashioned with different shapes to cover different openings as illustrated and described in different grinders in embodiments of the invention.

A user may use grinder 2000 just as was described above for grinder 1700, with the additional advantage of being able to cover opening 1603 after loading a bud into the crush-free zone. The cover may again be rotated to expose opening 1603 after the bud is shredded. In one embodiment cover 2001 may be made slightly bowed upward such that when fastener 1702 is tightened the underside of the cover is urged against the top of the upper cutting element creating enough friction such that the cover will stay in a set position relative to the upper cutting element until and unless intentionally moved.

Referring now back to FIGS. 4 and 6 a circumferential groove in the inside wall of the upper cutting element was described with two opening into the groove, and tabs were described on a wall of the lower cutting element that were positioned to enter the openings to the groove in just one position, such that the upper and the lower cutting elements could only be engaged with the blade-free regions aligned, and would remain engaged by the groove until realigned at the one position that allowed the cutting elements to be disengaged. This locking groove arrangement might be implemented on any one of the many embodiments that are described above with reference to FIGS. 11A through 20A and 20B. Further, it will be apparent to the skilled person that the features described in different embodiments with reference to FIGS. 11A through 20A and 20B may be applied in about any mixture to describe new and different embodiments of herb grinders according to the present invention.

The skilled person will understand that embodiments of the present invention described herein are exemplary only, and that there will be many alterations that may be made within the scope of the invention. Limitations to the invention are set only in the claims below.

I claim:

1. An herb processor, comprising:
   a first cutting element having a first annular body concentric about a central axis with a first outside and a first inside diameter extending a first height from a base disk having a second outside diameter greater than the first outside diameter, the base disk presenting a first planar, annular rim outside the annular body, also providing a floor within the annular body, and a first plurality of cutting blades extending at a right angle from the floor; and
   a second cutting element having a second annular body concentric about the central axis with a planar top, ending at a second planar, annular rim at an open end away from the planar top, the second annular body having a third outside diameter equal to the second outside diameter and a second inside diameter providing a slip fit with the first outside diameter of the first annular body, the planar top having a through opening entirely to one side of a diameter of the planar top, and a second plurality of cutting blades extending from the planar top within the second annular body;
   wherein the second cutting element engages the first cutting element with the second annular body over the first annular body until the second planar, annular rim contacts the first planar annular rim of the first cutting element, and wherein the first plurality of cutting blades is confined to a first areal region of the floor, such that at one specific rotary position in engagement there are no cutting blades on the floor directly below the through opening in the planar top.

2. The herb processor of claim 1, further comprising a central post projecting from the floor of the first cutting element, symmetrical about the central axis, having a fourth outside diameter less than the first inside diameter of the first annular body, the post having a top in a horizontal plane with a central threaded hole on the central axis, and further comprising a fastener having a male threaded portion and a constant diameter portion of a diameter less than the diameter of a hole through a center of the planar top, the fastener passing through the top of the second cutting element and engaging the threaded hole in the post, such that the second cutting element is restrained to rotate relative to the first cutting element, and the second cutting element is kept in engagement with the first cutting element by the fastener.

3. The herb processor of claim 2 further comprising the central post having a horizontal cross section in a star shape.

4. The herb processor of claim 2 further comprising a planar closure element engaged to the fastener above the planar top of the second cutting element by a hole having a diameter to rotate on the constant diameter portion of the fastener and an areal extent sufficient to cover the through opening in the planar top of the second cutting element while so engaged, such that the planar closure element in one rotary position fully covers the through opening and in another leaves the through opening fully open.

5. The herb processor of claim 4 comprising a friction mechanism configured to keep the planar closure at a set rotary position with the second cutting element.

6. The herb processor of claim 1 wherein the through opening has a first straight edge parallel to the diameter of the planar top and a second edge in a circular curve.

7. The herb processor of claim 1 wherein the through opening has first and second straight sides intersecting at an apex toward the center of the planar top and a third edge in a circular curve.

8. The herb processor of claim 1 wherein the through opening is of one of a circular or an oval shape to one side of the diameter of the planar top.

9. The herb processor of claim 1 further comprising a first mark on the base disk of the first cutting element near the first annular rim of the base disk, and a second mark on an outside of the annular body of the second cutting element near the second annular rim, such that, with the cutting elements fully engaged and the first and second marks aligned, the cutting elements are engaged at the one specific rotary position where there are no cutting blades on the floor directly below the through opening in the planar top.

10. The herb processor of claim 1 further comprising a first permanent magnet embedded in the first annular rim of the base disk and a second permanent magnet embedded in the second annular rim of the second cutting element, the permanent magnets positioned such that with the magnets aligned with opposite poles facing the cutting elements are engaged at the one specific rotary position where there are no cutting blades on the floor directly below the through opening in the planar top, and attractive force of the facing magnets urges the cutting elements together.

11. The herb processor of claim 10 further comprising a third permanent magnet embedded in the first annular rim of the base disk and a fourth permanent magnet embedded in the second annular rim of the second cutting element, such that the third and the fourth permanent magnets align as the first and the second permanent magnets align, the third and the fourth permanent magnets embedded such that they align with opposite poles facing.

12. The herb processor of claim 1 further comprising a central post projecting from the floor of the first cutting element, symmetrical about the central axis, having a fourth outside diameter less than the first inside diameter of the first annular body, the central post having a first permanent magnet embedded in a top planar surface, and further comprising a second permanent magnet embedded at a center point of an inside surface of the planar top, the magnets embedded such that with the cutting elements engaged the magnets present opposite poles, urging the cutting elements to stay engaged.

13. A method for herb processing, comprising:
    implementing a first cutting element having a first annular body concentric about a central axis with a first outside and a first inside diameter extending a first height from a base disk having a second outside diameter greater than the first outside diameter, the base disk presenting a first planar, annular rim outside the annular body, also providing a floor within the annular body, and a first plurality of cutting blades extending at a right angle from the floor in a first areal region, a second, separate areal region of the floor having no cutting blades;
    implementing a second cutting element having a second annular body concentric about the central axis with a planar top, ending at a second planar, annular rim at an open end away from the planar top, the second annular body having a third outside diameter equal to the second outside diameter and a second inside diameter providing a slip fit with the first outside diameter of the first annular body, the planar top having a through opening entirely to one side of a diameter of the planar top, and a second plurality of cutting blades extending from the planar top within the second annular body, confined to a first areal region of the planar top, leaving a second areal region of the planar top with no cutting blades;
    engaging the second cutting element with the first cutting element with the second annular body over the first annular body until the second planar, annular rim contacts the first planar annular rim of the first cutting element, at one specific relative rotary position of the cutting elements such that the through opening in the planar top is directly over the second areal region of the floor having no cutting blades;
placing material through the opening in the planar top onto the second areal region of the floor; and
    rotating the cutting elements relative to one another.

14. The method of claim 13 further comprising implementing a central post projecting from the floor of the first cutting element, symmetrical about the central axis, having a fourth outside diameter less than the first inside diameter of the first annular body, the post having a top in a horizontal plane with a central threaded hole on the central axis, and joining the second cutting element to the first by a fastener through a center hole on the top, such that the second cutting element is held engaged to the first cutting element, and enabled to rotate about the fastener.

15. The method of claim 13 further comprising implementing the central post with a horizontal cross section in a star shape.

16. The method of claim 14 further comprising implementing a planar closure element of a shape and area sufficient to cover the opening through the top of the second cutting element, engaging the closure element by the fastener above the planar top of the second cutting element, enabling the closure element to rotate such that the planar closure element in one rotary position fully covers the through opening and in another leaves the through opening fully open.

17. The method of claim 16 further comprising implementing a friction mechanism configured to keep the planar closure at a set rotary position with the second cutting element.

18. The method of claim 13 comprising shaping the through opening with a first straight edge parallel to the diameter of the planar top and a second edge in a circular curve.

19. The method of claim 13 comprising shaping the through opening with first and second straight sides intersecting at an apex toward the center of the planar top and a third edge in a circular curve.

20. The method of claim 13 comprising shaping the through opening as of one of a circular or an oval shape to one side of the diameter of the planar top.

21. The method of claim 13 further comprising placing a first mark on the base disk of the first cutting element near the first annular rim of the base disk, and placing a second mark on an outside of the annular body of the second cutting element near the second annular rim, such that, with the cutting elements fully engaged and the first and second marks aligned, the cutting elements are engaged at the one specific rotary position where there are no cutting blades on the floor directly below the through opening in the planar top.

22. The method of claim 13 further comprising embedding a first permanent magnet in the first annular rim of the base disk and embedding a second permanent magnet in the second annular rim of the second cutting element, the permanent magnets positioned such that with the magnets aligned with opposite poles facing the cutting elements are engaged at the one specific rotary position where there are no cutting blades on the floor directly below the through opening in the planar top, and attractive force of the facing magnets urges the cutting elements together.

23. The method of claim 22 further comprising embedding a third permanent magnet in the first annular rim of the base disk and embedding a fourth permanent magnet in the second annular rim of the second cutting element, such that the third and the fourth permanent magnets align as the first and the second permanent magnets align, the third and the fourth permanent magnets embedded such that they align with opposite poles facing.

24. The method of claim 13 further comprising implementing a central post projecting from the floor of the first cutting element, symmetrical about the central axis, having a fourth outside diameter less than the first inside diameter of the first annular body, the central post having a first permanent magnet embedded in a top planar surface, and further comprising embedding a second permanent magnet at a center point of an inside surface of the planar top, the magnets embedded such that with the cutting elements engaged the magnets present opposite poles, urging the cutting elements to stay engaged.

* * * * *